US012739815B2

(12) United States Patent
Zhang et al.

(10) Patent No.: US 12,739,815 B2
(45) Date of Patent: Sep. 15, 2026

(54) APPARATUS AND METHOD THEREOF IN WIRELESS COMMUNICATION SYSTEM

(71) Applicant: SAMSUNG ELECTRONICS CO., LTD., Suwon-si (KR)

(72) Inventors: Sa Zhang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 18/305,114

(22) Filed: Apr. 21, 2023

(65) Prior Publication Data

US 2023/0345448 A1 Oct. 26, 2023

(30) Foreign Application Priority Data

Apr. 24, 2022 (CN) ........................ 202210436011.9

(51) Int. Cl.
*H04W 72/11* (2023.01)
*H04W 72/1273* (2023.01)
*H04W 72/21* (2023.01)

(52) U.S. Cl.
CPC ........ *H04W 72/11* (2023.01); *H04W 72/1273* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 2018/0288746 | A1* | 10/2018 | Zhang | H04W 72/23 |
| 2019/0104539 | A1* | 4/2019 | Park | H04W 72/23 |
| 2019/0215900 | A1* | 7/2019 | Pan | H04W 72/23 |
| 2021/0058197 | A1* | 2/2021 | Gao | H04L 1/1819 |
| 2021/0218504 | A1* | 7/2021 | Wang | H04L 1/1812 |
| 2021/0273753 | A1* | 9/2021 | Chen | H04L 1/1812 |
| 2022/0053534 | A1* | 2/2022 | Deogun | H04L 5/0092 |
| 2022/0061074 | A1 | 2/2022 | Babaei et al. | |
| 2022/0109528 | A1 | 4/2022 | Babaei | |
| 2022/0231818 | A1* | 7/2022 | Lee | H04L 5/0098 |
| 2023/0164807 | A1* | 5/2023 | Lee | H04W 4/06 370/329 |
| 2025/0039791 | A1* | 1/2025 | Guo | H04W 52/0229 |

FOREIGN PATENT DOCUMENTS

| | | | |
|---|---|---|---|
| WO | 2021066117 | A1 | 4/2021 |
| WO | 2022081948 | A1 | 4/2022 |

OTHER PUBLICATIONS

International Search Report and Written Opinion of the International Searching Authority dated Jul. 14, 2023, in connection with International Application No. PCT/KR2023/005391, 7 pages.

(Continued)

*Primary Examiner* — Jamaal Henson

(57) ABSTRACT

An apparatus and a method performed by the same in a wireless communication system are provided. The method includes determining that a first bandwidth part (BWP) is deactivated and a second BWP is activated, and determining whether to process a semi-persistent scheduling (SPS) physical downlink shared channel (PDSCH) configuration activated before the first BWP is deactivated and the second BWP is activated.

12 Claims, 20 Drawing Sheets

(56) References Cited

OTHER PUBLICATIONS

Supplementary European Search Report dated Feb. 25, 2025, in connection with European Patent Application No. 23796704.7, 10 pages.

ASUSTeK, "Discussion on mechanisms to support group scheduling for RRC Connected UEs," R1-2112080, 3GPP TSG RAN WG1 #107-e, e-Meeting, Nov. 11-19, 2021, 4 pages.

* cited by examiner

| row index | dmrs-TypeA-Position | PDSCH mapping type | $K_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG.8A

| row index | { $K_0$, S, L } set |
| --- | --- |
| 1 | { 0, 0, 7 }, { 1, 2, 7 }, {2, 4, 4} |
| 2 | { 1, 3, 4 }, { 3, 5, 7 } |
| 3 | { 0, 0, 7 }, { 3, 7, 7 } |

FIG.8B

APPARATUS AND METHOD THEREOF IN WIRELESS COMMUNICATION SYSTEM

CROSS-REFERENCE TO RELATED APPLICATIONS

This application is based on and claims priority under 35 U.S.C. § 119 to Chinese Patent Application No. 202210436011.9 filed on Apr. 24, 2022, in the China National Intellectual Property Office, the disclosure of which is incorporated by reference herein in its entirety.

BACKGROUND

1. Field

The present disclosure generally relates to a field of wireless communication, and in particular, to an apparatus and method performed by the same in a wireless communication system.

2. Description of Related Art

5$^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, there are needs to enhance current procedures of transmission/reception of PDSCHs and PUSCHs.

SUMMARY

According to at least one embodiment of the disclosure, a method performed by a terminal in a wireless communication system is provided. The method includes: determining that a first bandwidth part (BWP) is deactivated and/or a second BWP is activated; and determining whether to process a semi-persistent scheduling (SPS) physical downlink shared channel (PDSCH) configuration activated before the first BWP is deactivated and/or the second BWP is activated.

In some embodiments, the determining of whether to process the semi-persistent scheduling (SPS) physical downlink shared channel (PDSCH) configuration activated before the first BWP is deactivated and/or the second BWP is activated may include determining whether to suspend or clear the SPS PDSCH configuration activated before the first BWP is deactivated and/or the second BWP is activated.

In some embodiments, when the SPS PDSCH configuration is suspended or cleared, SPS PDSCHs for the SPS PDSCH configuration are not received and/or the SPS PDSCH configuration is released.

For example, when the first BWP and the second BWP are uplink (UL) BWPs, the first BWP being deactivated and the second BWP being activated may correspond to uplink BWP switching.

For example, when the first BWP and the second BWP are downlink (DL) BWPs, the first BWP being deactivated and the second BWP being activated may correspond to downlink BWP switching.

According to at least one embodiment of the disclosure, a method performed by a terminal in a wireless communication system is provided. The method includes: performing bandwidth part (BWP) switching; and determining whether to receive semi-persistent scheduling (SPS) physical downlink shared channels (PDSCHs) for a SPS PDSCH configuration activated before the BWP switching.

In some embodiments, the BWP switching is used to activate an inactive BWP and deactivate an active BWP. For example, when BWP switching from a current active BWP to another BWP is performed, the current active BWP is deactivated and the other BWP is activated.

In some embodiments, the BWP switching may include uplink BWP switching and/or downlink BWP switching. For example, the BWP switching may be performed based on a BWP switching indication (e.g., via a physical downlink control channel (PDCCH) and/or higher layer signaling, such as radio resource control (RRC) signaling) and/or an associated timer.

According to at least one embodiment of the disclosure, a method performed by a terminal in a wireless communication system is provided. The method includes: receiving configuration information related to hybrid automatic repeat request-acknowledgement (HARQ-ACK) feedback through a radio resource control (RRC) message, where the configuration information includes HARQ-ACK feedback related information for each multicast radio network temporary identifier (RNTI) of one or more multicast RNTIs; determining an indication related to enabling/disabling the HARQ-ACK feedback in an associated downlink control information (DCI); and performing the HARQ-ACK feedback corresponding to the multicast RNTI based on the determined indication related to enabling/disabling the HARQ-ACK feedback.

According to some embodiments of the disclosure, a terminal in a wireless communication system is also provided. The terminal includes: a transceiver configured to transmit and receive signals; and a controller coupled to the transceiver and configured to perform one or more operations of the above-described methods performed by the terminal.

According to some embodiments of the disclosure, a computer-readable storage medium on which one or more computer programs are stored is also provided, wherein any of the above-described methods may be implemented when the one or more computer programs are performed by one or more processors.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to illustrate the technical schemes of the embodiments of the disclosure more clearly, the drawings of the embodiments of the disclosure will be briefly introduced below. Apparently, the drawings described below only refer to some embodiments of the disclosure, and do not limit the disclosure. In the drawings:

FIG. 8A illustrates an example of time domain resource allocation tables according to some embodiments of the present disclosure;

FIG. 8B illustrates an example of time domain resource allocation tables according to some embodiments of the present disclosure;

DETAILED DESCRIPTION

Figure 1:
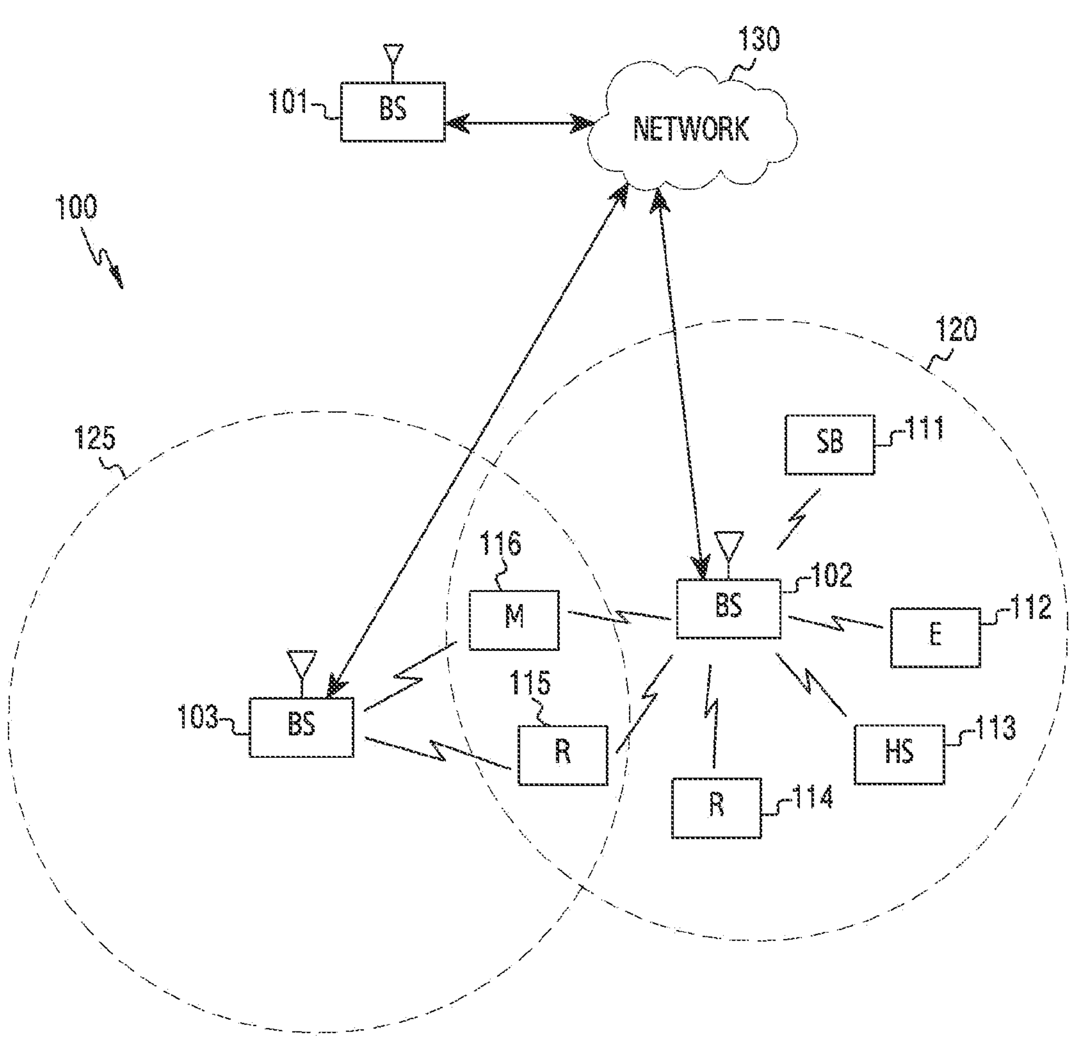
FIG. 1 illustrates an example of wireless network according to some embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In order to make the purpose, technical schemes and advantages of the embodiments of the disclosure clearer, the technical schemes of the embodiments of the disclosure will be described clearly and completely with reference to the drawings of the embodiments of the disclosure. Apparently, the described embodiments are a part of the embodiments of the disclosure, but not all embodiments. Based on the described embodiments of the disclosure, all other embodiments obtained by those of ordinary skill in the art without creative labor belong to the protection scope of the disclosure.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A, B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments of the disclosure are not intended to limit and/or define the scope of the present disclosure. For example, unless otherwise defined, the technical terms or scientific terms used in the disclosure shall have the ordinary meaning understood by those with ordinary skills in the art to which the present disclosure belongs.

It should be understood that "first," "second" and similar words used in the disclosure do not express any order, quantity or importance, but are only used to distinguish different components. Similar words such as singular forms "a," "an" or "the" do not express a limitation of quantity, but express the existence of at least one of the referenced item, unless the context clearly dictates otherwise. For example, reference to "a component surface" includes reference to one or more of such surfaces.

As used herein, any reference to "an example" or "example," "an implementation" or "implementation," "an embodiment" or "embodiment" means that particular elements, features, structures or characteristics described in connection with the embodiment is included in at least one embodiment. The phrases "in one embodiment" or "in one example" appearing in different places in the specification do not necessarily refer to the same embodiment.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, the term "set" means one or more. Accordingly, a set of items can be a single item or a collection of two or more items.

In this disclosure, to determine whether a specific condition is satisfied or fulfilled, expressions, such as "greater than" or "less than" are used by way of example and expressions, such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versa), etc.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper," "lower," "left" and "right" are only used to express a relative positional relationship, and when an absolute position of the described object changes, the relative positional relationship may change accordingly.

The various embodiments discussed below for describing the principles of the disclosure in the patent document are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to LTE and/or 5G communication systems, those skilled in the art will understand that the main points of the disclosure can also be applied to other communication systems with similar technical backgrounds and channel formats with slight modifications without departing from the scope of the disclosure. The technical schemes of the embodiments of the present application can be applied to various communication systems, and for example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UMTS), worldwide interoperability for microwave access (WiMAX) communication systems, 5th generation (5G) systems or new radio (NR) systems, etc. In addition, the technical schemes of the embodiments of the present application can be applied to future-oriented communication technologies. In addition, the technical schemes of the embodiments of the present application can be applied to future-oriented communication technologies.

Hereinafter, the embodiments of the disclosure will be described in detail with reference to the accompanying drawings. It should be noted that the same reference numerals in different drawings will be used to refer to the same elements already described.

The following FIG. 1 to FIG. 3B describe various embodiments implemented by using orthogonal frequency division multiplexing (OFDM) or orthogonal frequency division multiple access (OFDMA) communication technologies in wireless communication systems. The descriptions of FIG. 1 to FIG. 3B do not mean physical or architectural implications for the manner in which different embodiments may be implemented. Different embodiments of the disclosure may be implemented in any suitably arranged communication systems.

FIG. 1 illustrates an example of wireless network 100 according to some embodiments of the present disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station (BS)" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For example, the terms "terminal," "user equipment" and "UE" may be used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
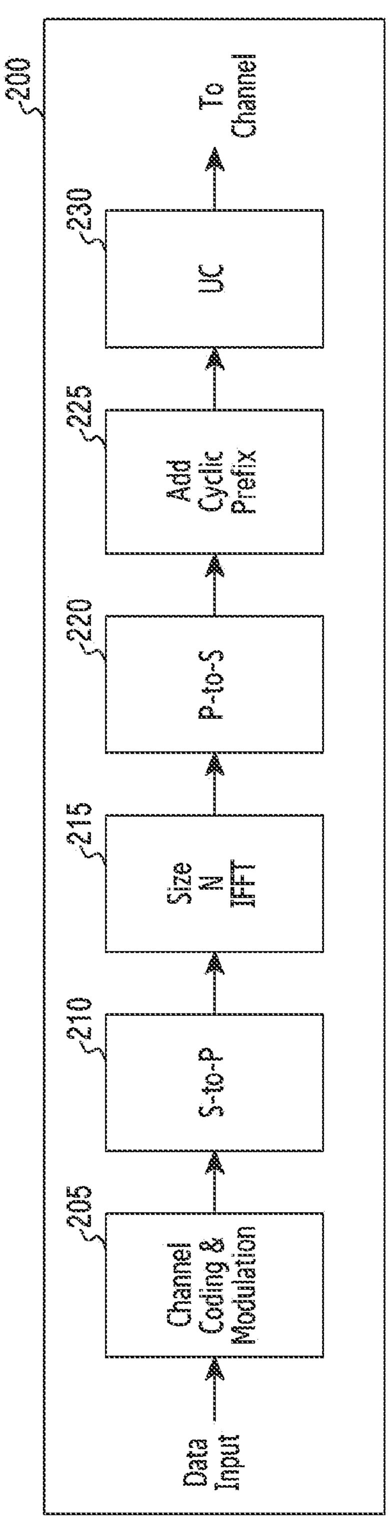
FIG. 2A illustrates example of wireless transmission and reception paths according to some embodiments of the present disclosure.
Figure 2B:
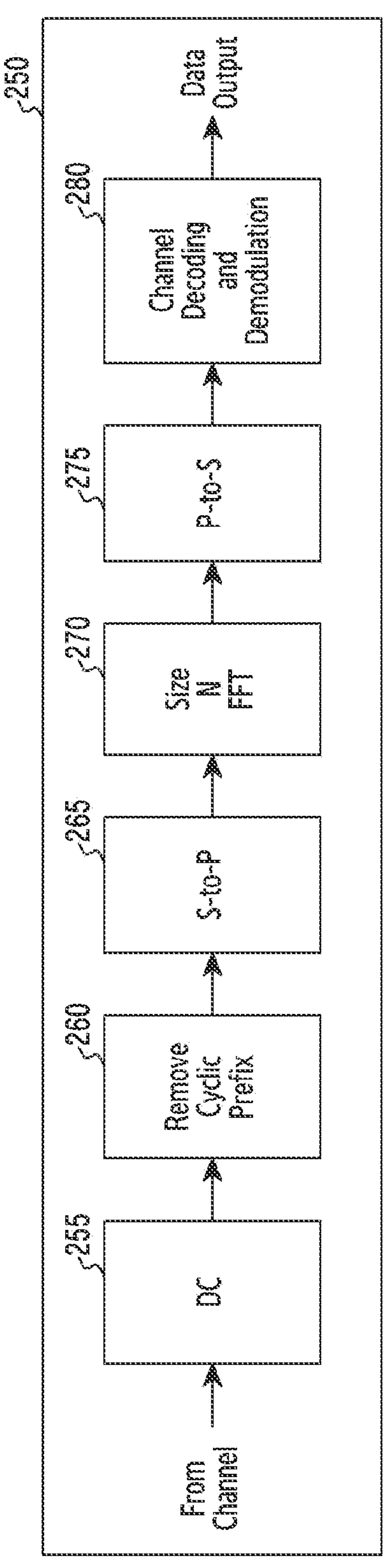
FIG. 2B illustrates example of wireless transmission and reception paths according to some embodiments of the present disclosure.

FIGS. 2A and 2B illustrate examples of wireless transmission and reception paths according to some embodiments of the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The Parallel-to-Serial block 220 converts (such as multiplexes) parallel time domain output symbols from the Size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time domain baseband signal. The Serial-to-Parallel block 265 converts the time domain baseband signal into a parallel time domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
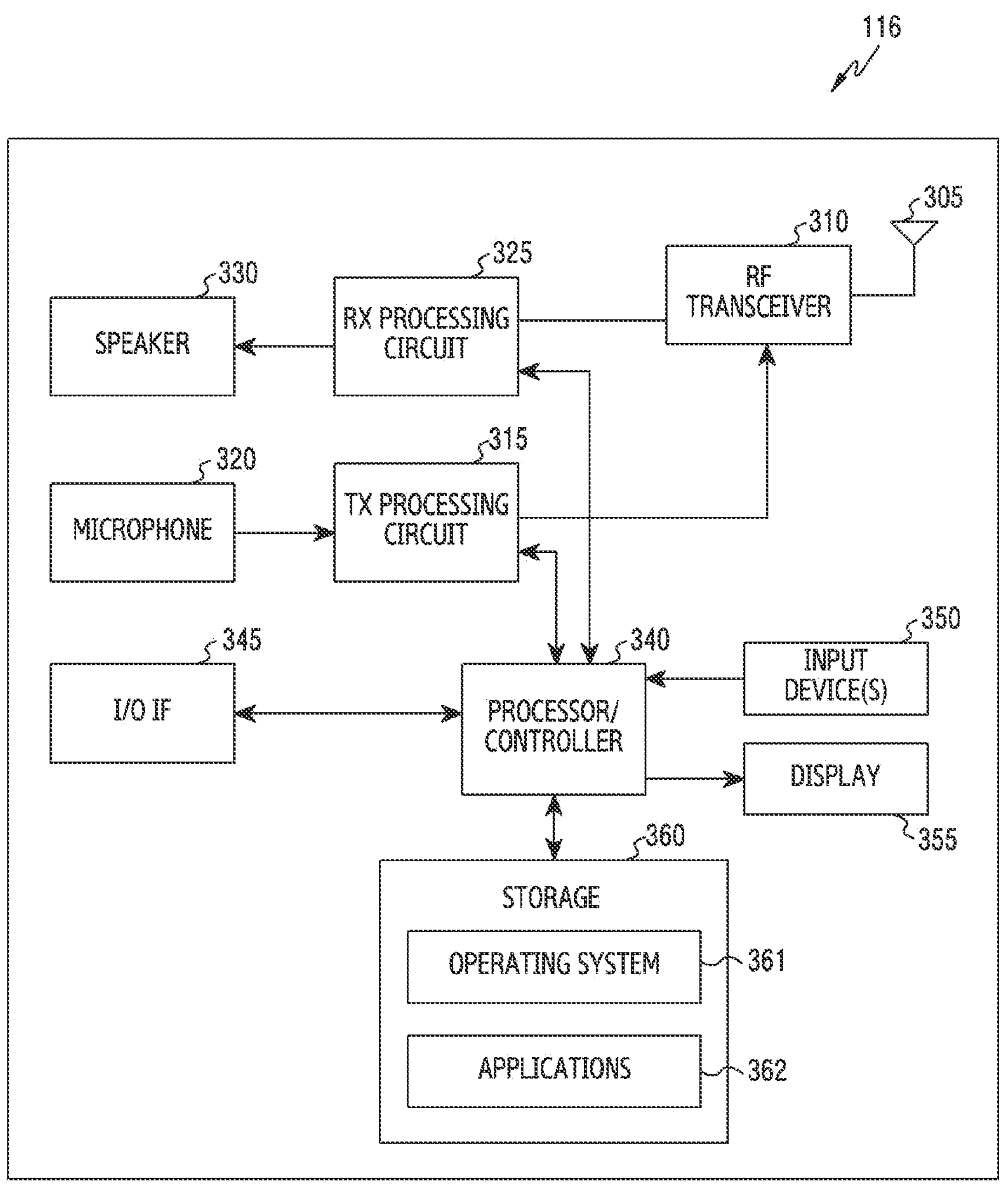
FIG. 3A illustrates an example of UE according to some embodiments of the present disclosure.

FIG. 3A illustrates an example of UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/ controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
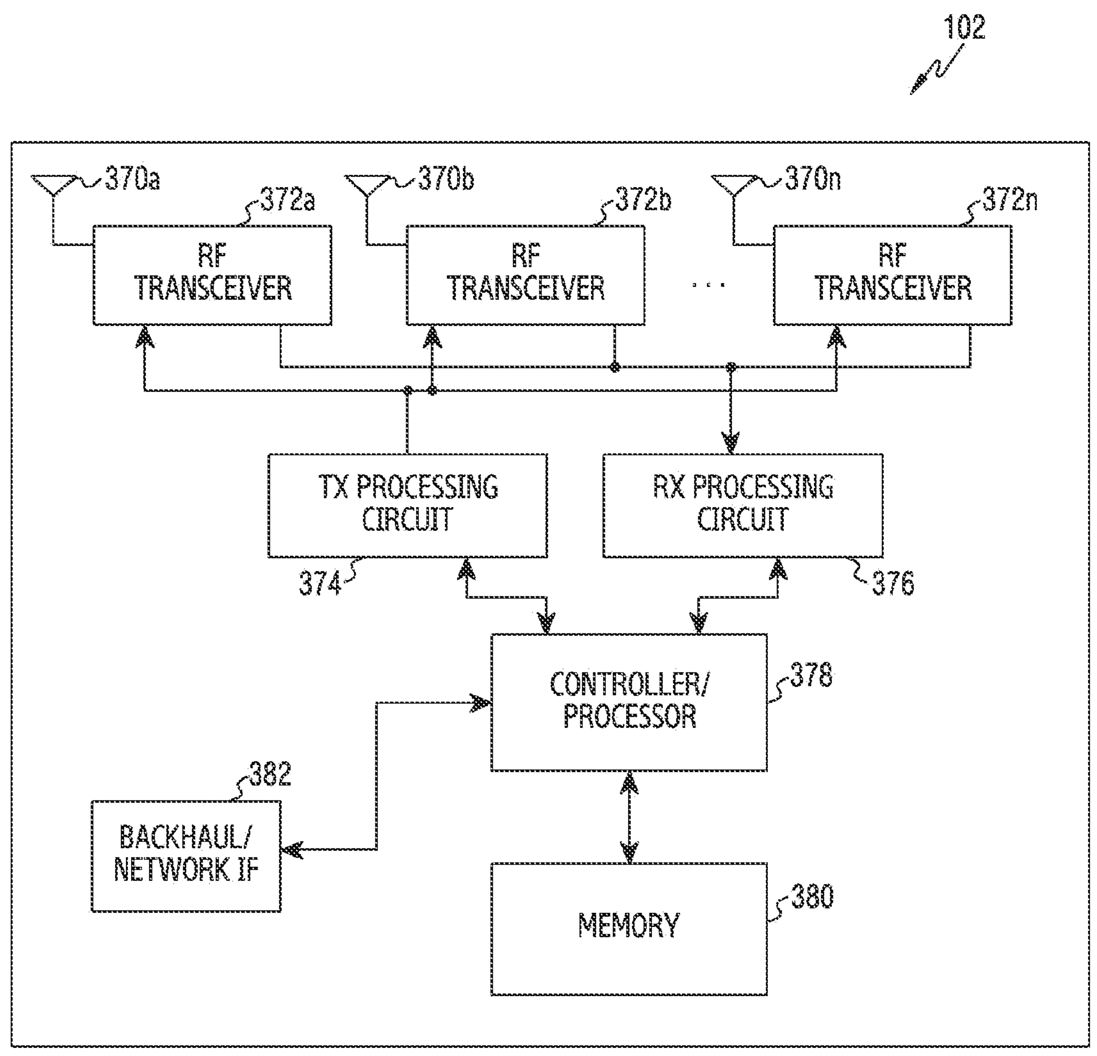
FIG. 3B illustrates an example of gNB according to some embodiments of the present disclosure.

FIG. 3B illustrates an example gNB 102 according to some embodiments of the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

As shown in FIG. 3B, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Those skilled in the art will understand that, "terminal" and "terminal device" as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a PCS (personal communications service), which may combine voice, data processing, fax and/or data communication capabilities; a PDA (Personal Digital Assistant), which may include a radio frequency receiver, a pager, an internet/intranet access, a web browser, a notepad, a calendar and/or a GPS (Global Positioning System) receiver; a conventional laptop and/or palmtop computer or other devices having and/or including a radio frequency receiver. "Terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a MID (Mobile Internet Device) and/or a mobile phone with music/video playing functions, a smart TV, a set-top box and other devices.

With the rapid development of information industry, especially the increasing demand from mobile Internet and internet of things (IoT), it brings unprecedented challenges to the future mobile communication technology. According to the report of International Telecommunication Union (ITU) ITU-R M.[IMT.BEYOND 2020.TRAFFIC], it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating into the mobile communication network. In order to meet the unprecedented challenges, the communication industry and academia have carried out extensive research on the fifth generation (5G) mobile communication technology to face the 2020s. At present in ITU report ITU-R M.[IMT.VISION], the framework and overall goals of the future 5G has been discussed, in which the demand outlook, application scenarios and important performance indicators of 5G are described in detail.

With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3GPP (3d Generation Partnership Project), the first stage of 5G is already in progress. To support more flexible scheduling, the 3GPP decides to support variable Hybrid Automatic Repeat request-Acknowledgement (HARQ-ACK) feedback delay in 5G. In existing Long Term Evolution (LTE) systems, a time from reception of downlink data to uplink transmission of HARQ-ACK is fixed.

For example, in Frequency Division Duplex (FDD) systems, the delay is 4 subframes. In Time Division Duplex (TDD) systems, a HARQ-ACK feedback delay is determined for a corresponding downlink subframe based on an uplink and downlink configuration. In 5G systems, whether FDD or TDD systems, for a determined downlink time unit (e.g., a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios-eMBB (enhanced mobile broadband), mMTC (massive machine-type communication) and URLLC (ultra-reliable and low-latency communication). The eMBB scenario aims to further improve data transmission rate on the basis of the existing mobile broadband service scenario, so as to enhance user experience and pursue ultimate communication experience between people. mMTC and URLLC are, for example, the application scenarios of the Internet of Things, but their respective emphases are different: mMTC being mainly information interaction between people and things, while URLLC mainly reflecting communication requirements between things.

In a communication system, a bandwidth part (BWP) may be a subset of a total bandwidth of a cell (total cell bandwidth). A base station may configure multiple BWPs for a UE through higher layer signaling. In a communication system such as NR, a bandwidth of a UE may change/switch dynamically. BWP switching is used to activate an inactive BWP and deactivate an active BWP in a certain time. In an FDD system, uplink (UL) BWP changing/switching and downlink (DL) BWP changing/switching may be independent. When the UL BWP of the UE is switched, the DL BWP may not be switched. If the UE is configured with multiple serving cells, when the UL BWP of a primary serving cell is switched, the DL BWP of a secondary serving cell may not be switched. For a semi-persistent scheduling (SPS) PDSCH, when the UL BWP is switched (for example, the DL BWP is not switched), how to receive a SPS PDSCH and/or feed back HARQ-ACK for the SPS PDSCH is a problem to be solved.

In some cases, the UE may be configured with multicast broadcast services (MBS) service. Transmission parameters (e.g., MBS frequency resource(s) in a downlink BWP) of MBS PDSCH(s) may be configured for the downlink BWP through an MBS common frequency resource (CFR) configuration (e.g., 3GPP information element (IE) CFR-ConfigMulticast). The UE receives the MBS PDSCH(s) within an MBS CFR. In the case of DL BWP switching, whether the BWP after DL BWP switching contains the MBS CFR before DL BWP switching or not, a reactivation for SPS PDSCHs is required, which may cause additional PDCCH signaling overhead. Therefore, in this case, how to reduce the PDCCH signaling overhead is also a problem to be solved.

In order to solve at least the above technical problems, embodiments of the disclosure provide a method performed by a terminal, the terminal, a method performed by a base station and the base station in a wireless communication system, and a non-transitory computer-readable storage medium. Hereinafter, various embodiments of the disclosure will be described in detail with reference to the accompanying drawings.

In embodiments of the disclosure, for the convenience of description, a first transceiving node and a second transceiving node are defined. For example, the first transceiving node may be a base station, and the second transceiving node may be a UE. In the following examples, the base station is taken as an example (but not limited thereto) to illustrate the first transceiving node, and the UE is taken as an example (but not limited thereto) to illustrate the second transceiving node.

Exemplary embodiments of the disclosure are further described below with reference to the drawings.

The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that changes may be made to the illustrated embodiments and examples without departing from the scope of the disclosure.

Figure 4:
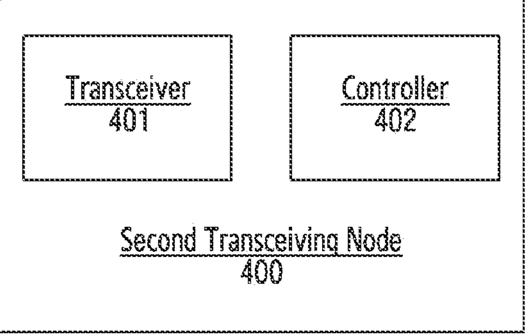
FIG. 4 illustrates a second transceiving node according to some embodiments of the present disclosure.

FIG. 4 illustrates a second transceiving node according to an embodiment of the present disclosure.

Referring to FIG. 4, the second transceiving node 400 may include a transceiver 401 and a controller 402.

The transceiver 401 may be configured to receive first data and/or first control signaling from the first transceiving node, and transmit second data and/or second control signaling to the first transceiving node in a determined time unit.

The controller 402 may be an application specific integrated circuit or at least one processor. The controller 402 may be configured to control the overall operation of the second transceiving node and control the second transceiving node to implement the methods provided in the embodiments of the disclosure. For example, the controller 402 may be configured to determine the second data and/or the second control signaling and a time unit for transmitting the second data and/or the second control signaling based on the first data and/or the first control signaling, and control the transceiver 401 to transmit the second data and/or the second control signaling to the first transceiving node in the determined time unit.

In some embodiments, the controller 402 may be configured to perform one or more of operations in methods of various embodiments described below. For example, the controller 402 may be configured to perform one or more of operations in a method 500 to be described in connection with FIG. 5, a method 900 described in connection with FIG. 9, a method 1000 described in connection with FIG. 10 and a method 1100 described in connection with FIG. 11 later.

In some embodiments, the first data may be data transmitted by the first transceiving node to the second transceiving node. In the following examples, downlink data carried by a PDSCH (Physical Downlink Shared Channel) is taken as an example (but not limited thereto) to illustrate the first data.

In some embodiments, the second data may be data transmitted by the second transceiving node to the first transceiving node. In the following examples, uplink data carried by a PUSCH (Physical Uplink Shared Channel) is taken as an example to illustrate the second data, but not limited thereto.

In some embodiments, the first control signaling may be control signaling transmitted by the first transceiving node to the second transceiving node. In the following examples, downlink control signaling is taken as an example (but not limited thereto) to illustrate the first control signaling. The downlink control signaling may be DCI (downlink control information) carried by a PDCCH (Physical Downlink Control Channel) and/or control signaling carried by a PDSCH (Physical Downlink Shared Channel). For example, the DCI may be UE specific DCI, and the DCI may also be common DCI. The common DCI may be DCI common to a part of UEs, such as group common DCI, and the common DCI may also be DCI common to all of the UEs. The DCI may be uplink DCI (e.g., DCI for scheduling a PUSCH) and/or downlink DCI (e.g., DCI for scheduling a PDSCH).

In some embodiments, the second control signaling may be control signaling transmitted by the second transceiving node to the first transceiving node. In the following examples, uplink control signaling is taken as an example (but is not limited thereto) to illustrate the second control signaling. The uplink control signaling may be UCI (Uplink Control Information) carried by a PUCCH (Physical Uplink Control Channel) and/or control signaling carried by a PUSCH (Physical Uplink Shared Channel). A type of UCI may include one or more of: HARQ-ACK information, SR (Scheduling Request), LRR (Link Recovery Request), CSI (Chanel State Information) or CG (Configured Grant) UCI.

In embodiments of the disclosure, when UCI is carried by a PUCCH, the UCI may be used interchangeably with the PUCCH.

In some embodiments, a PUCCH carrying SR may be a PUCCH carrying positive SR and/or negative SR. SR may be positive SR and/or negative SR.

In some embodiments, the CSI may also be Part 1 CSI and/or Part 2 CSI.

In some embodiments, a first time unit is a time unit in which the first transceiving node transmits the first data and/or the first control signaling. In the following examples, a downlink time unit is taken as an example (but not limited thereto) to illustrate the first time unit.

In some embodiments, a second time unit is a time unit in which the second transceiving node transmits the second data and/or the second control signaling. In the following examples, an uplink time unit is taken as an example (but not limited thereto) to illustrate the second time unit.

In some embodiments, the first time unit and the second time unit may be one or more slots, one or more subslots, one or more OFDM symbols, or one or more subframes.

Herein, depending on the network type, the term "base station" or "BS" can refer to any component (or a set of components) configured to provide wireless access to a network, such as a Transmission Point (TP), a Transmission and Reception Point (TRP), an evolved base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio (NR) interface/access, Long Term Evolution (LTE), LTE advanced (LTE-A), High Speed Packet Access (HSPA), Wi-Fi 802.11a/b/g/n/ac, etc.

In describing a wireless communication system and in the disclosure described below, higher layer signaling or higher layer signals may be signal transferring methods for transferring information from a base station to a terminal over a downlink data channel of a physical layer or from a terminal to a base station over an uplink data channel of a physical layer, and examples of the signal transferring methods may include signal transferring methods for transferring information via Radio Resource Control (RRC) signaling, Packet Data Convergence Protocol (PDCP) signaling, or a Medium Access Control (MAC) Control Element (MAC CE).

Figure 5:
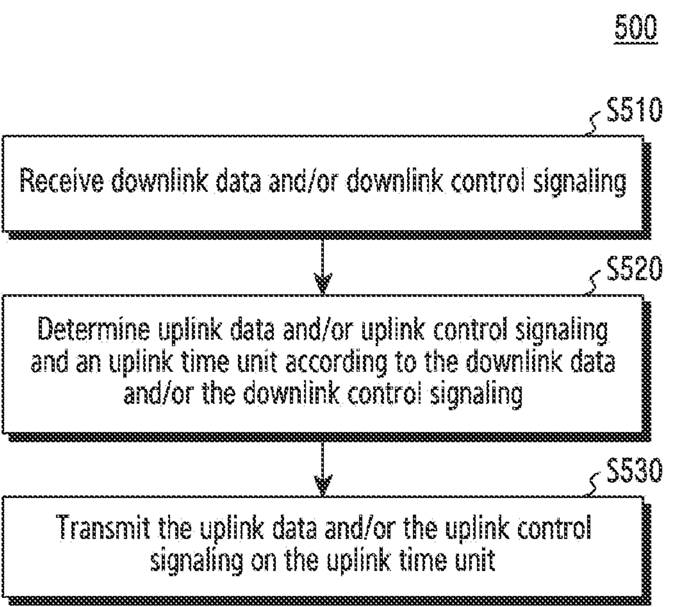
FIG. 5 illustrates a flowchart of a method performed by a UE according to some embodiments of the present disclosure.

FIG. 5 illustrates a flowchart of a method performed by a UE according to embodiments of the disclosure.

Referring to FIG. 5, in step S510, the UE may receive downlink data (e.g., downlink data carried by a PDSCH) and/or downlink control signaling from a base station. For example, the UE may receive the downlink data and/or the downlink control signaling from the base station based on predefined rules and/or received configuration information (e.g., configuration parameters).

In step S520, the UE determines uplink data and/or uplink control signaling and an uplink time unit based on the downlink data and/or downlink control signaling.

In step S530, the UE transmits the uplink data and/or the uplink control signaling to the base station in an uplink time unit.

In some embodiments, acknowledgement/negative acknowledgement (ACK/NACK) for downlink transmissions may be performed through HARQ-ACK.

In some embodiments, the downlink control signaling may include DCI carried by a PDCCH and/or control signaling carried by a PDSCH. For example, the DCI may be used to schedule transmission of a PUSCH or reception of a PDSCH. Some examples of uplink transmission timing will be described below with reference to FIG. 6A to FIG. 6C.

Figure 6A:
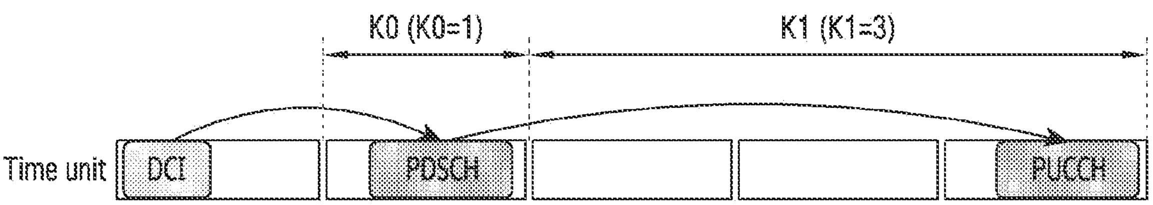
FIG. 6A illustrates an example of uplink transmission timing according to some embodiments of the present disclosure.

In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. For example, FIG. 6A gives an example in which K0=1. In the example illustrated in FIG. 6A, the time interval from the PDSCH scheduled by the DCI to the PDCCH carrying the DCI is one slot. In embodiments of the disclosure, "a UE receives DCI" may mean that "the UE detects the DC."

Figure 6B:
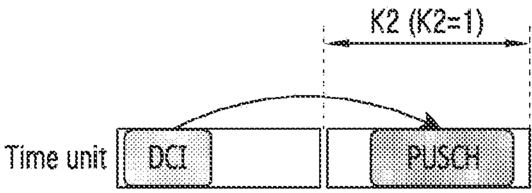
FIG. 6B illustrates an example of uplink transmission timing according to some embodiments of the present disclosure.

In another example, the UE receives the DCI and transmits the PUSCH based on time domain resources indicated by the DCI. For example, a timing parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot. K2 may also represent a time interval between a PDCCH for activating a CG (configured grant) PUSCH and the first activated CG PUSCH. In examples of the disclosure, unless otherwise specified, the PUSCH may be a dynamically scheduled PUSCH (e.g., scheduled by DCI) (e.g., may be referred to as DG (dynamic grant) PUSCH, in embodiments of the disclosure) and/or a PUSCH not scheduled by DCI (e.g., CG PUSCH).

In yet another example, the UE receives the PDSCH, and may transmit HARQ-ACK information for the PDSCH reception in a PUCCH in the uplink time unit. For example, a timing parameter (which may also be referred to as a timing value) K1 (e.g., the parameter dl-DataToUL-ACK in 3GPP) may be used to represent a time interval between the PUCCH for transmitting the HARQ-ACK information for the PDSCH reception and the PDSCH, and K1 may be in units of uplink time units, such as slots or subslots. In a case where K1 is in units of slots, the time interval is a value of a slot offset between the PUCCH for feeding back the HARQ-ACK information for the PDSCH reception and the PDSCH, and K1 may be referred to as a slot timing value. For example, FIG. 6A gives an example in which K1=3. In the example illustrated in FIG. 6A, the time interval between the PUCCH for transmitting the HARQ-ACK information for the PDSCH reception and the PDSCH is 3 slots. It should be noted that in embodiments of the disclosure, the timing parameter K1 may be used interchangeably with a timing parameter $K_1$, the timing parameter K0 may be used interchangeably with a timing parameter $K_0$, and the timing parameter K2 may be used interchangeably with a timing parameter $K_2$.

The PDSCH may be a PDSCH scheduled by the DCI and/or a SPS PDSCH. The UE may periodically receive the SPS PDSCH after the SPS PDSCH is activated by the DCI. In examples of the disclosure, the SPS PDSCH may be equivalent to a PDSCH not scheduled by the DCI/PDCCH. After the SPS PDSCH is released (deactivated), the UE may no longer receive the SPS PDSCH.

In embodiments of the disclosure, HARQ-ACK may be HARQ-ACK for a SPS PDSCH reception (e.g., HARQ-ACK not indicated by DCI) and/or HARQ-ACK indicated by a DCI format (e.g., HARQ-ACK for a PDSCH reception scheduled by a DCI format).

Figure 6C:
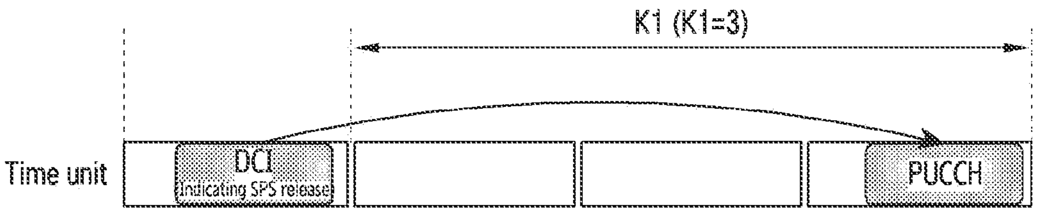
FIG. 6C illustrates an example of uplink transmission timing according to some embodiments of the present disclosure.

In yet another example, the UE receives the DCI (e.g., DCI indicating SPS (Semi-Persistent Scheduling) PDSCH release (deactivation)), and may transmit HARQ-ACK information for the DCI in the PUCCH in the uplink time unit. For example, the timing parameter K1 may be used to represent a time interval between the PUCCH for transmitting the HARQ-ACK information for the DCI and the DCI, and K1 may be in units of uplink time units, such as slots or subslots. For example, FIG. 6C gives an example in which K1=3. In the example of FIG. 6C, the time interval between the PUCCH for transmitting the HARQ-ACK information for the DCI and the DCI is 3 slots. For example, the timing parameter K1 may be used to represent a time interval between a PDCCH reception with DCI indicating SPS PDSCH release (deactivation) and the PUCCH feeding back HARQ-ACK for the PDCCH reception.

In some embodiments, in step S520, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

In some embodiments, the base station may configure higher layer signaling for the UE based on a UE capability previously received from the UE (e.g., in step S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and the higher layer signaling may include RRC signaling and/or a MAC CE.

In some embodiments, downlink channels (downlink resources) may include PDCCHs and/or PDSCHs. Uplink channels (uplink resources) may include PUCCHs and/or PUSCHs.

Figure 7:
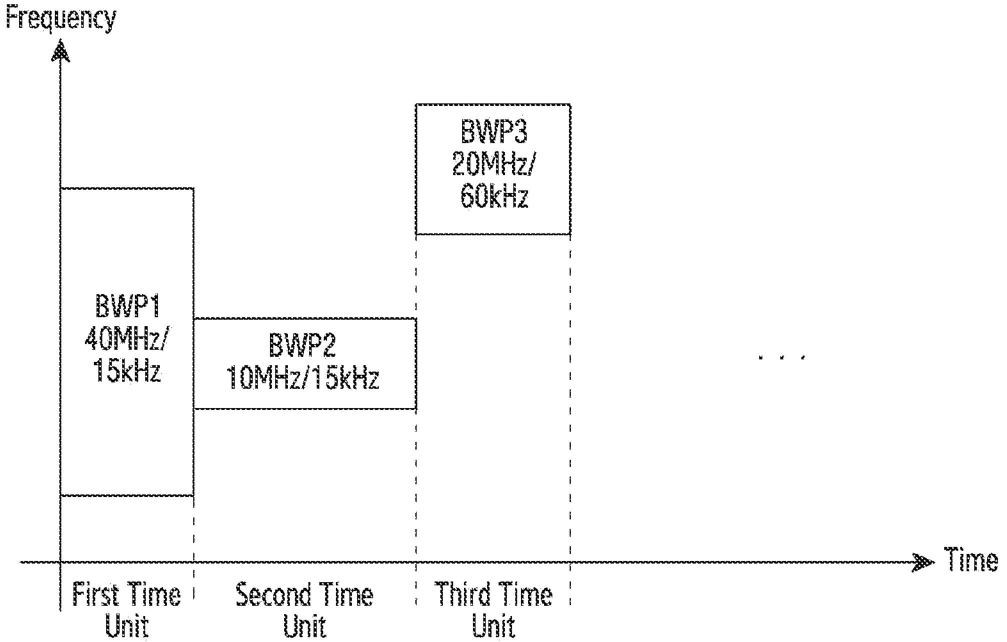
FIG. 7 illustrates an example of BWP switching according to some embodiments of the present disclosure.

In NR, the bandwidth of a UE may change dynamically. The base station may configure multiple BWPs (Bandwidth Parts) for the UE through higher layer signaling. The base station may activate one BWP of the multiple BWPs. For example, the activated BWP may be the active BWP. The base station may also indicate to switch from the current active BWP to another BWP through signaling (e.g., DCI) (which may be called active BWP switching or change, or simply BWP switching or change). For example, the other BWP switched to becomes the active BWP. When the UE receives an indication of BWP switching, the activated BWP is deactivated and the other BWP is activated. FIG. 7 illustrates an example of BWP switching according to embodiments of the disclosure. As shown in FIG. 7, in the first time unit, the amount of services of the UE is large, and the system configures a large bandwidth (BWP1) for the UE; in the second time unit, the amount of services of the UE is small, and the system configures a small bandwidth (BWP2) for the UE to just meet basic communication requirements; and in the third time unit, the system may find that there is a wide range of frequency selective fading in the bandwidth of BWP1, or the resource in the frequency range of BWP1 is scarce, so a new bandwidth (BWP3) may be configured to the UE.

The UE only needs to adopt the center frequency and sampling rate of a corresponding BWP in the corresponding BWP. Moreover, each BWP is not only different in frequency and bandwidth, but also can correspond to different configurations. For example, the subcarrier spacing, CP type, SSB (synchronization signal and PBCH block) (including Primary Synchronization Signal (PSS), Secondary Synchronization Signal (SSS) and PBCH) period of each BWP can be configured differently to adapt to different services.

In some embodiments, the UE may be configured with two levels of priorities for uplink transmission. For example, the UE may be configured to multiplex UCIs with different priorities via higher layer signaling (e.g., through the 3GPP parameter UCI-MUXWithDifferentiatPriority); otherwise (e.g., if the UE is not configured to multiplex UCIs with different priorities), the UE performs prioritization for PUCCHs and/or PUSCHs with different priorities. For example, the two levels of priorities may include a first priority and a second priority which are different from each other. In an example, the first priority may be higher than the second priority, that is, the first priority is the higher priority, and the second priority is the lower priority. In another example, the first priority may be lower than the second priority. However, embodiments of the disclosure are not limited to this, and for example, the UE may be configured with more than two levels of priorities. For the sake of convenience, in embodiments of the disclosure, description will be made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

In some examples, multiplexing multiple uplink transmissions (e.g., PUCCH and/or PUSCH) overlapping in time domain may be multiplexing UCI information carried in the PUCCH in one PUCCH or PUSCH.

In some examples, the prioritization of two uplink transmissions (e.g., PUCCH and/or PUSCH) overlapping in time domain by the UE may include the UE transmitting an uplink transmission (e.g., PUCCH or PUSCH) of a higher priority and not transmitting an uplink transmission (e.g., PUCCH or PUSCH) of a lower priority.

In some embodiments, the UE may be configured with a subslot-based PUCCH transmission. For example, a subslot length parameter (which may also be referred to as a parameter with respect to a subslot length in embodiments of the disclosure) (e.g., the parameter subslotLengthForPUCCH in 3GPP) of each PUCCH configuration parameter of the first PUCCH configuration parameter and the second PUCCH configuration parameter may be 7 OFDM symbols or 6 OFDM symbols or 2 OFDM symbols. Subslot configuration length parameters in different PUCCH configuration parameters may be configured separately. If no subslot length parameter is configured in a PUCCH configuration parameter, the scheduling time unit of this PUCCH configuration parameter is one slot by default. If a subslot length parameter is configured in the PUCCH configuration parameter, the scheduling time unit of this PUCCH configuration parameter is L (L is the configured subslot configuration length) OFDM symbols.

The mechanism of slot-based PUCCH transmissions is basically the same as that of subslot-based PUCCH transmissions. In the disclosure, a slot may be used to represent a PUCCH occasion unit; for example, if the UE is configured with subslots, a slot which is a PUCCH occasion unit may be replaced with a subslot. For example, it may be specified by protocols that if the UE is configured with the subslot length parameter (e.g., the parameter subslotLength- ForPUCCH in 3GPP), unless otherwise indicated, a number of symbols contained in the slot of the PUCCH transmission is indicated by the subslot length parameter.

For example, if the UE is configured with the subslot length parameter, and subslot n is the last uplink subslot overlapping with a PDSCH reception or PDCCH reception (e.g., SPS PDSCH release, and/or indicating secondary cell dormancy, and/or triggering a Type-3 HARQ-ACK codebook report and without scheduling a PDSCH reception), then HARQ-ACK information for the PDSCH reception or PDCCH reception is transmitted in an uplink subslot n+k, where k is determined by the timing parameter K1 (the definition of the timing parameter K1 may refer to the previous description). For another example, if the UE is not configured with the subslot length parameter, and slot n is the last uplink slot overlapping with a downlink slot where the PDSCH reception or PDCCH reception is located, then the HARQ-ACK information for the PDSCH reception or PDCCH reception is transmitted in an uplink slot n+k, where k is determined by the timing parameter K1.

In embodiments of the disclosure, unicast may refer to a manner in which a network communicates with a UE, and multicast or groupcast may refer to a manner in which a network communicates with multiple UEs. For example, a unicast PDSCH may be a PDSCH received by a UE, and the scrambling of the PDSCH may be based on a Radio Network Temporary Identifier (RNTI) specific to the UE, e.g., Cell-RNTI (C-RNTI). A multicast PDSCH may be a PDSCH received by more than one UE simultaneously, and the scrambling of the multicast PDSCH may be based on a UE-group common RNTI. For example, the UE-group common RNTI for scrambling the multicast PDSCH may include an RNTI (may be referred to as Group RNTI (G-RNTI) in embodiments of the disclosure) for scrambling of a dynamically scheduled multicast transmission (e.g., PDSCH) or an RNTI (may be referred to as Group configured scheduling RNTI (G-CS-RNTI) in embodiments of the disclosure) for scrambling of a multicast SPS transmission (e.g., SPS PDSCH). The G-CS-RNTI and the G-RNTI may be different RNTIs or same RNTI. UCI(s) of the unicast PDSCH may include HARQ-ACK information, SR, or CSI of the unicast PDSCH reception. UCI(s) of the multicast PDSCH may include HARQ-ACK information for the multicast PDSCH reception. In embodiments of the disclosure, "multicast" may be replaced by "broadcast."

In some embodiments, a HARQ-ACK codebook may include HARQ-ACK information for one or more PDSCHs and/or DCI. If the HARQ-ACK information for the one or more PDSCHs and/or DCI is transmitted in a same uplink time unit, the UE may generate the HARQ-ACK codebook based on a predefined rule. For example, if a PDSCH is successfully decoded, the HARQ-ACK information for this PDSCH reception is positive ACK. The positive ACK may be represented by 1 in the HARQ-ACK codebook, for example. If a PDSCH is not successfully decoded, the HARQ-ACK information for this PDSCH reception is Negative ACK (NACK). NACK may be represented by 0 in the HARQ-ACK codebook, for example.

For example, the UE may generate the HARQ-ACK codebook based on the pseudo code specified by protocols. In an example, if the UE receives a DCI format that indicates SPS PDSCH release (deactivation), the UE transmits HARQ-ACK information (ACK) for the DCI format. In another example, if the UE receives a DCI format that indicates secondary cell dormancy, the UE transmits the HARQ-ACK information (ACK) for the DCI format. In yet another example, if the UE receives a DCI format that indicates to transmit HARQ-ACK information (e.g., a Type-3 HARQ-ACK codebook in 3GPP) of all HARQ-ACK processes of all configured serving cells, the UE transmits the HARQ-ACK information of all HARQ-ACK processes of all configured serving cells. In order to reduce a size of the Type-3 HARQ-ACK codebook, in an enhanced Type-3 HARQ-ACK codebook, the UE may transmit HARQ-ACK information of a specific HARQ-ACK process of a specific serving cell based on an indication of the DCI.

In yet another example, if the UE receives a DCI format that schedules a PDSCH, the UE transmits HARQ-ACK information for the PDSCH reception. In yet another example, the UE receives a SPS PDSCH, and the UE transmits HARQ-ACK information for the SPS PDSCH reception. In yet another example, if the UE is configured by higher layer signaling to receive a SPS PDSCH, the UE transmits HARQ-ACK information for the SPS PDSCH reception. The reception of the SPS PDSCH configured by higher layer signaling may be cancelled by other signaling. In yet another example, if at least one uplink symbol (e.g., OFDM symbol) of the UE in a semi-static frame structure configured by higher layer signaling overlaps with a symbol of a SPS PDSCH reception, the UE does not receive the SPS PDSCH. In yet another example, if the UE is configured by higher layer signaling to receive a SPS PDSCH according to a predefined rule, the UE transmits HARQ-ACK information for the SPS PDSCH reception.

It should be noted that in the embodiments of the disclosure, "A" overlapping with "B" may mean that "A" at least partially overlaps with "B." That is, "A" overlapping with "B" includes the case that "A" completely overlaps with "B." "A" overlapping with "B" may mean that "A" overlaps with "B" in time domain and/or "A" overlaps with "B" in frequency domain.

In some embodiments, if HARQ-ACK information transmitted in a same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCH receptions, the UE may generate HARQ-ACK information according to a rule for generating a HARQ-ACK codebook for a SPS PDSCH reception.

In some embodiments, if HARQ-ACK information transmitted in a same uplink time unit includes HARQ-ACK information for a DCI format, and/or a dynamically scheduled PDSCH (e.g., a PDSCH scheduled by a DCI format), the UE may generate HARQ-ACK information according to a rule for generating a HARQ-ACK codebook for a dynamically scheduled PDSCH and/or a DCI format. For example, the UE may determine to generate a semi-static HARQ-ACK codebook (e.g., Type-1 HARQ-ACK codebook in 3GPP) or a dynamic HARQ-ACK codebook (e.g., Type-2 HARQ-ACK codebook in 3GPP) according to a PDSCH HARQ-ACK codebook configuration parameter (e.g., the parameter pdsch-HARQ-ACK-Codebook in 3GPP). The dynamic HARQ-ACK codebook may also be an enhanced dynamic HARQ-ACK codebook (e.g., Type-2 HARQ-ACK codebook based on grouping and HARQ-ACK retransmission in 3GPP).

In some embodiments, if HARQ-ACK information transmitted in a same uplink time unit includes only HARQ-ACK information for a SPS PDSCH (e.g., a PDSCH not scheduled by a DCI format), the UE may generate the HARQ-ACK codebook according to a rule for generating a HARQ-ACK codebook for a SPS PDSCH reception (e.g., the pseudo code for generating a HARQ-ACK codebook for a SPS PDSCH reception defined in 3GPP).

For the semi-static HARQ-ACK codebook (e.g., 3GPP TS 38.213 Type-1 HARQ-ACK codebook), it may determine the size of the HARQ-ACK codebook and an order of HARQ-ACK bits according to a semi-statically parameter (e.g., a parameter configured by higher layer signaling). For a serving cell c, an active downlink BWP (bandwidth part) and an active uplink BWP, the UE determines a set of $M_{A,c}$ occasions for candidate PDSCH receptions for which the UE can transmit corresponding HARQ-ACK information in a PUCCH in an uplink slot $n_U$.

$M_{A,c}$ may be determined by at least one of:

a) HARQ-ACK slot timing values K1 of the active uplink BWP;

b) a downlink time domain resource allocation (TDRA) table;

c) an uplink SCS configuration and a downlink SCS configuration;

d) a semi-static uplink and downlink frame structure configuration; or e) a downlink slot offset parameter (e.g., 3GPP parameter $$N_{slot,offset,c}^{DL})$$

for the serving cell c and its corresponding slot offset SCS (e.g., 3GPP parameter $\mu_{offset,DL,c}$), and a slot offset parameter (e.g., 3GPP parameter $$N_{slot,offset}^{UL})$$

for a primary serving cell and its corresponding slot offset SCS (e.g., 3GPP parameter $\mu_{offset,UL}$).

The parameter K1 is used to determine a candidate uplink slot, and then determine candidate downlink slots according to the candidate uplink slot. The candidate downlink slots satisfy at least one of the following conditions: (i) if the time unit of the PUCCH is a subslot, the end of at least one candidate PDSCH reception in the candidate downlink slots overlaps with the candidate uplink slot in time domain; or (ii) if the time unit of the PUCCH is a slot, the end of the candidate downlink slots overlap with the candidate uplink slot in time domain. It should be noted that, in embodiments of the disclosure, a starting symbol may be used interchangeably with a start position, and an end symbol may be used interchangeably with an end position. In some embodiments, the starting symbol may be replaced by the end symbol, and/or the end symbol may be replaced by the starting symbol.

A number of PDSCHs in a candidate downlink slot for which HARQ-ACK needs to be fed back may be determined by a maximum value of a number of non-overlapping valid PDSCHs in the downlink slot (e.g., the valid PDSCHs may be PDSCHs that do not overlap with semi-statically configured uplink symbols). Time domain resources occupied by the PDSCHs may be determined by (i) a time domain resource allocation table configured by higher layer signaling (in embodiments of the disclosure, it may also be referred to as a table associated with time domain resource allocation) and (ii) a certain row in the time domain resource allocation table dynamically indicated by DCI. Each row in the time domain resource allocation table may define information with respect to time domain resource allocation.

For example, for the time domain resource allocation table, an indexed row defines a timing value (e.g., time unit (e.g., slot) offset (e.g., K0)) between a PDCCH and a PDSCH, and a start and length indicator (SLIV), or directly defines a starting symbol and allocation length. For example, for the first row of the time domain resource allocation table, a start OFDM symbol is 0 and an OFDM symbol length is 4; for the second row of the time domain resource allocation table, the start OFDM symbol is 4 and the OFDM symbol length is 4; and for the third row of the time domain resource allocation table, the start OFDM symbol is 7 and the OFDM symbol length is 4. The DCI for scheduling the PDSCH may indicate any row in the time domain resource allocation table. When all OFDM symbols in the downlink slot are downlink symbols, the maximum value of the number of non-overlapping valid PDSCHs in the downlink slot is 2. At this time, the Type-1 HARQ-ACK codebook may need to feed back HARQ-ACK information for two PDSCHs in the downlink slot on the serving cell.

FIGS. 8A and 8B illustrate examples of a time domain resource allocation table. Specifically, FIG. 8A illustrates a time domain resource allocation table in which one PDSCH is scheduled by one row, and FIG. 8B illustrates a time domain resource allocation table in which multiple PDSCHs are scheduled by one row. Referring to FIG. 8A, each row corresponds to a value of a timing parameter K0, a value of S indicating a starting symbol, and a value of L indicating a length, where an SLIV may be determined by the value of S and the value of L. Referring to FIG. 8B, unlike FIG. 8A, each row corresponds to values of multiple sets of {K0, S, L}.

In some embodiments, the dynamic HARQ-ACK codebook (e.g., Type-2 HARQ-ACK codebook in 3GPP) and/or the enhanced dynamic HARQ-ACK codebook (e.g., Type-2 HARQ-ACK codebook based on grouping and HARQ-ACK retransmission in 3GPP) may determine a size and an order of the HARQ-ACK codebook according to an assignment indicator. For example, the assignment indicator may be a DAI (Downlink Assignment Indicator). In the following embodiments, the assignment indicator as the DAI is taken as an example for illustration. However, the embodiments of the disclosure are not limited thereto, and any other suitable assignment indicator may be adopted.

In some embodiments, a DAI field includes at least one of a first DAI and a second DAI.

In some examples, the first DAI may be a C-DAI (Counter-DAI). The first DAI may indicate an accumulative number of at least one of DCI scheduling PDSCH(s), DCI indicating SPS PDSCH release (deactivation), or DCI indicating secondary cell dormancy. For example, the accumulative number may be an accumulative number up to the current serving cell and/or the current time unit. For example, C-DAI may refer to: an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy)); or an accumulative number of PDCCH(s) up to the current time unit; or an accumulative number of PDSCH transmission(s) up to the current time unit; or an accumulative number of {serving cell, time unit} pair(s) in which PDSCH transmission(s) related to PDCCH(s) (e.g., scheduled by the PDCCH(s)) and/or PDCCH(s) (e.g., PDCCH indicating SPS release and/or PDCCH indicating secondary cell dormancy) is present, up to the current serving cell and/or the current time unit; or an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit; or an accumulative number of PDSCHs (the PDSCHs are PDSCHs with corresponding PDCCHs) already scheduled by the base station up to the current serving cell and/or the current time unit; or an accumulative number of time units with PDSCH transmissions (the PDSCHs are PDSCHs with corresponding PDCCHs) already scheduled by the base station up to the current serving cell and/or the current time unit. The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first DAI is received and the information of the first DAI. The first DAI may be included in a downlink DCI format.

In some examples, the second DAI may be a T-DAI (Total-DAI). The second DAI may indicate a total number of at least one of all PDSCH receptions, DCI indicating SPS PDSCH release (deactivation), or DCI indicating secondary cell dormancy. For example, the total number may be a total number of all serving cells up to the current time unit. For example, T-DAI may refer to: a total number of {serving cell, time unit} pairs scheduled by PDCCH(s) up to the current time unit within a time window (which may also include a number of PDCCHs for indicating SPS release); or a total number of PDSCH transmissions up to the current time unit; or a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit; or a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit; or a total number of PDSCHs (the PDSCHs are PDSCHs with corresponding PDCCHs) already scheduled by the base station up to the current serving cell and/or the current time unit; or a total number of time units with PDSCH transmissions (e.g., the PDSCHs are PDSCHs with corresponding PDCCHs) already scheduled by the base station up to the current serving cell and/or the current time unit. The second DAI may be included in the downlink DCI format and/or an uplink DCI format. The second DAI included in the uplink DCI format is also referred to as UL DAI.

In the following examples, the first DAI as the C-DAI and the second DAI as the T-DAI are taken as an example for illustration, but the examples are not limited thereto.

Tables 1 and 2 show a correspondence between the DAI field and $V_{T\text{-}DAI,m}$, $V_{C\text{-}DAI,c,m}$ or $$V_{T\text{-}DAI}^{UL}.$$

Numbers of bits of the C-DAI and T-DAI are limited.

For example, in a case where the C-DAI or T-DAI is represented with 2 bits, the value of the C-DAI or T-DAI in the DCI may be determined by equations in Table 1. $V_{T\text{-}DAI,m}$ or $$V_{T\text{-}DAI}^{UL}$$

is the value of the T-DAI in DCI received in a PDCCH Monitoring Occasion (MO) m, and $V_{C\text{-}DAI,c,m}$ is the value of the C-DAI in DCI for a serving cell c received in the PDCCH monitoring occasion m. Both $V_{T\text{-}DAI,m}$ and $V_{C\text{-}DAI,c,m}$ are related to a number of bits of the DAI field in the DCI. MSB is the Most Significant Bit and LSB is the Least Significant Bit.

TABLE 1

| MSB, LSB of DAI Field | $V_{T-DAI,m}$ or $V_{C-DAI,c,m}$ or $V_{T-DAI}^{UL}$ | Y |
|---|---|---|
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5 or 9, as shown in Table 1, all of the DAI field are indicated with "0,0" and the value of $V_{T\text{-}DAI,m}$ or $V_{C\text{-}DAI,c,m}$ is represented as "1" by the equation in Table 1. Y may represent the value of the DAI corresponding to the number of DCIs actually transmitted by the base station (the value of the DAI before conversion by the equation in the table).

For example, in a case where the C-DAI or T-DAI in the DCI is 1 bit, values greater than 2 may be represented by equations in Table 2.

TABLE 2

| DAI field | $V_{T-DAI,m}$ or $V_{C-DAI,c,m}$ | Y |
|---|---|---|
| 0 | 1 | (Y − 1) mod 2 + 1 = 1 |
| 1 | 2 | (Y − 1) mod 2 + 1 = 2 |

It should be noted that, unless the context clearly indicates otherwise, all or one or more of the methods, steps or operations described in embodiments of the disclosure may be specified by protocols and/or configured by higher layer signaling and/or indicated by dynamic signaling. The dynamic signaling may be PDCCH and/or DCI and/or DCI format. For example, SPS PDSCH and/or CG PUSCH may be dynamically indicated in corresponding activated DCI/DCI format/PDCCH. All or one or more of the described methods, steps and operations may be optional. For example, if a certain parameter (e.g., parameter X) is configured, the UE performs a certain approach (e.g., approach A), otherwise (if the parameter, e.g., parameter X, is not configured), the UE performs another approach (e.g., approach B).

It should be noted that, a PCell (Primary Cell) or PSCell (Primary Secondary Cell) in embodiments of the disclosure may be used interchangeably with a cell having a PUCCH.

It should be noted that, methods for downlink in embodiments of the disclosure may also be applicable to uplink, and methods for uplink may also be applicable to downlink. For example, a PDSCH may be replaced with a PUSCH, a SPS PDSCH may be replaced with a CG PUSCH, and downlink symbols may be replaced with uplink symbols, so that methods for downlink may be applicable to uplink.

It should be noted that, methods applicable to scheduling of multiple PDSCH/PUSCHs in embodiments of the disclosure may also be applicable to a PDSCH/PUSCH transmission with repetitions. For example, a PDSCH/PUSCH of multiple PDSCHs/PUSCHs may be replaced by a repetition of multiple repetitions of the PDSCH/PUSCH transmission.

It should be noted that in methods of the disclosure, "configured and/or indicated with a transmission with repetitions" may be understood that the number of the repetitions of the transmission is greater than 1. For example, "configured and/or indicated with a transmission with repetitions" may be replaced with "PUCCH repeatedly transmitted on more than one slot/sub-slot." "Not configured and/or indicated with a transmission with repetitions" may be understood that the number of the repetitions of the transmission equals to 1. For example, "PUCCH that is not configured and/or indicated with repetitions" may be replaced by "PUCCH transmission with the number of the repetitions of 1." For example, the UE may be configured with a parameter $$N_{PUCCH}^{repeat}$$

related to the number of repetitions of PUCCH; When the parameter $$N_{PUCCH}^{repeat}$$

is greater than 1, it may mean that the UE is configured with a PUCCH transmission with repetitions, and the UE may repeat the PUCCH transmission on $$N_{PUCCH}^{repeat}$$

time units (e.g., slots); when the parameter is equal to 1, it may mean that the UE is not configured with a PUCCH transmission with repetitions. For example, the repeatedly transmitted PUCCH may include only one type of UCI. If the PUCCH is configured with repetitions, in embodiments of the disclosure, a repetition of the multiple repetitions of the PUCCH may be used as a PUCCH (or a PUCCH resource), or all of the repetitions of the PUCCH may be used as a PUCCH (or a PUCCH resource), or a specific repetition of the multiple repetitions of the PUCCH may be used as a PUCCH (or a PUCCH resource).

It should be noted that, in methods of the disclosure, a PDCCH and/or DCI and/or a DCI format schedules multiple PDSCHs/PUSCHs, which may be multiple PDSCHs/PUSCHs on a same serving cell and/or multiple PDSCHs/PUSCHs on different serving cells.

It should be noted that the multiple embodiments described in the disclosure may be combined in any order. In a combination, an embodiment may be performed one or more times.

It should be noted that the steps in the methods of the disclosure may be implemented in any order.

It should be noted that, in methods of the disclosure, "canceling a transmission" may mean canceling the transmission of the entire uplink channel and/or cancelling the transmission of a part of the uplink channel.

It should be noted that, in methods of the disclosure, "an order from small to large" (e.g., an ascending order) may be replaced by "an order from large to small" (e.g., a descending order), and/or "an order from large to small" (e.g., a descending order) may be replaced by "an order from small to large" (e.g., an ascending order).

It should be noted that, in methods of the disclosure, a PUCCH/PUSCH carrying A may be understood as a PUCCH/PUSCH only carrying A, and may also be understood as a PUCCH/PUSCH carrying at least A.

It should be noted that "slot" may be replaced by "sub-slot" or "time unit" in embodiments of the disclosure.

It should be noted that "at least one" in embodiments of the disclosure may be understood as "one" or "multiple." In the case of "multiple," it may be any permutation and combination. For example, at least one of A, B and C may be: A, B, C, AB, BA, ABC, CBA, ABCA, ABCCB, etc.

In FDD systems, UL BWP switching and DL BWP switching may be independent. When a UL BWP of the UE is switched, a DL BWP may not be switched. If the UE is configured with multiple serving cells, when the UL BWP of a primary serving cell is switched, the DL BWP of a secondary serving cell may not be switched. For a SPS PDSCH, when the UL BWP is switched (for example, the DL BWP is not switched), how to perform the SPS PDSCH reception and/or how to perform HARQ-ACK feedback for the SPS PDSCH reception is a problem to be solved.

In some embodiments, at least one of the following embodiments EMBODIMENT 1 to EMBODIMENT 4 may be adopted to receive SPS PDSCH(s) (for example, multicast SPS PDSCH(s)) and/or transmit HARQ-ACK information for the SPS PDSCH reception(s). For example, when the UL BWP is switched (for example, the UL BWP is switched and the DL BWP is not switched), at least one of the following embodiments EMBODIMENT 1 to EMBODIMENT 4 may be adopted to receive SPS PDSCH(s) and/or transmit HARQ-ACK information for the SPS PDSCH reception(s). For another example, when the UL BWP is switched, at least one of the following embodiments EMBODIMENT 1 to EMBODIMENT 4 may be adopted to receive MBS SPS PDSCH(s) and/or transmit HARQ-ACK information for the MBS SPS PDSCH reception(s).

Embodiment 1

In EMBODIMENT 1, whether to receive the SPS PDSCH(s) may be determined according to a HARQ-ACK feedback mode (for example, HARQ-ACK feedback mode of SPS PDSCH(s)). For example, the HARQ-ACK feedback mode may be at least one of the following modes.

Mode 1: transmitting HARQ-ACK information. For example, for a PDSCH reception, the UE transmits HARQ-ACK information for the PDSCH reception. Or, for the PDSCH reception, the UE transmits the HARQ-ACK information for the PDSCH reception, in case that a predefined condition is satisfied. Mode 1 may be divided into the following two sub-modes:

- Mode 1-1: transmitting ACK or NACK. As an example, transmitting one of ACK or NACK may be determined based on whether the UE correctly decodes the PDSCH reception (e.g., the corresponding transport block). For example, for the PDSCH reception, if the UE correctly decodes the PDSCH reception (e.g., the corresponding transport block), the UE transmits ACK (e.g., transmits the HARQ-ACK information with an ACK value). For example, for the PDSCH reception, if the UE does not correctly decode the PDSCH reception (e.g., the corresponding transport block), the UE transmits a NACK (e.g., transmits the HARQ-ACK information with a NACK value); and Mode 1-2: transmitting only NACK. For example, for the PDSCH reception, if the UE correctly decodes the PDSCH reception (e.g., the corresponding transport block), the UE does not transmit the HARQ-ACK information. For example, for the PDSCH reception, if the UE does not correctly decode the PDSCH reception (e.g., the corresponding transport block), the UE transmits a NACK (e.g., transmits the HARQ-ACK information with a NACK value).

Mode 2: not transmitting HARQ-ACK information. For example, for the PDSCH reception, the UE does not transmit the HARQ-ACK information regardless of whether the PDSCH reception (e.g., the corresponding transport block) is correctly decoded.

For example, if the HARQ-ACK feedback mode for a SPS PDSCH configuration is not to transmit HARQ-ACK (for example, Mode 2), after UL BWP switching, the UE receives SPS PDSCH(s) for the SPS PDSCH configuration; and/or, if the HARQ-ACK feedback mode for the SPS PDSCH configuration is to transmit HARQ-ACK (for example, mode 1-1 and/or mode 1-2), after UL BWP switching, the UE does not receive the SPS PDSCH(s) for the SPS PDSCH configuration.

This method is simple to implement, and for a specific HARQ-ACK feedback mode, and can avoid the reactivation of a SPS PDSCH configuration, and thus can reduce the PDCCH signaling overhead, improve the reliability of the downlink data transmission, and reduce the downlink data delay.

Embodiment 2

In EMBODIMENT 2, whether to receive the SPS PDSCH(s) may be configured by higher layer signaling. For example, the UE may receive a configuration on whether to receive the SPS PDSCH(s) via higher layer signaling. For example, a parameter (e.g., Parameter1) that indicates whether to receive the SPS PDSCH(s) after BWP switching may be configured in a SPS PDSCH configuration (e.g., 3GPP IE SPS-Config). If the UE is configured (e.g., provided) with the parameter (e.g., Parameter1), the UE receives the SPS PDSCH(s) for the SPS PDSCH configuration; otherwise (if the parameter (e.g., Parameter1) is not configured (e.g., not provided)), the UE does not receive the SPS PDSCH(s) for the SPS PDSCH configuration. For another example, the parameter (for example, Parameter1) may be configured in a downlink BWP configuration (e.g., 3GPP IE BWP-DownlinkDedicated) or an MBS common frequency resource, CFR) configuration (e.g., 3GPP IE CFR-ConfigMulticast).

This method is simple to implement, and can avoid reactivation of a SPS PDSCH configuration, and thus can reduce the PDCCH signaling overhead, improve the reliability of the downlink data transmission, and reduce the downlink data delay.

It should be noted that this method can be used for UL BWP switching and/or DL BWP switching.

Embodiment 3

In EMBODIMENT 3, whether to receive the SPS PDSCH(s) may be determined according to PUCCH time units and/or sets of timing parameters K1 before and after UL BWP switching (for example, the PUCCH time unit and/or the set of timing parameters K1 associated with the active UL BWP). For example, whether to receive the SPS PDSCH(s) may be determined according to the PUCCH time unit and/or the set of timing parameters K1 before UL BWP switching (for example, the PUCCH time unit and/or the set of timing parameters K1 associated with the active UL BWP before UL BWP switching) and the PUCCH time unit and/or the set of timing parameters K1 after UL BWP switching (for example, the PUCCH time unit and/or the set of timing parameters K1 associated with the active UL BWP after UL BWP switching). In some embodiments, if at least one of the following conditions COND1 to COND4 is satisfied, the UE receives the SPS PDSCH(s); and/or, if the at least one of the following conditions COND1 to COND4 is not satisfied, the UE does not receive the SPS PDSCH(s).

Condition COND1: the PUCCH time unit before UL BWP switching (for example, the PUCCH time unit corresponding to a physical layer priority) is the same as the PUCCH time unit after UL BWP switching. For example, the condition COND1 may include that a SCS before UL BWP switching is the same as the SCS after UL BWP switching, and the number of symbols contained in a slot (or sub-slot) before UL BWP switching is the same as the number of symbols contained in the slot (or sub-slot) after UL BWP switching.

Condition COND2: the set of K1 before UL BWP switching (for example, the set of K1 corresponding to a physical layer priority) is the same as the set of K1 after UL BWP switching.

Condition COND3: the set of K1 before UL BWP switching (for example, the set of K1 corresponding to a physical layer priority) belongs to (for example, is contained in) the set of K1 after UL BWP switching.

Condition COND4: for a SPS PDSCH configuration, the K1 indicated in a DCI format that activates the SPS PDSCH configuration is in the set of K1 after UL BWP switching.

It can be understood that one or more of the conditions COND1 to COND4 described above can be combined to form a new condition. When the new condition is satisfied, the UE receives the SPS PDSCH(s); and/or, when the new condition is not satisfied, the UE does not receive the SPS PDSCH(s).

As an example, if the PUCCH time unit before UL BWP switching (for example, the PUCCH time unit corresponding to a physical layer priority) is the same as the PUCCH time unit after UL BWP switching and/or the set of K1 before UL BWP switching (for example, the set of K1 corresponding to a physical layer priority) is the same as the set of K1 after UL BWP switching, the UE receives the SPS PDSCH(s); otherwise (for example, if the PUCCH time unit before UL BWP switching is different from the PUCCH time unit after UL BWP switching and/or the set of K1 before UL BWP switching is different from the set of K1 after UL BWP switching), the UE does not receive the SPS PDSCH(s).

As another example, for a SPS PDSCH configuration, if the PUCCH time unit before UL BWP switching (for example, the PUCCH time unit corresponding to a physical layer priority) is the same as the PUCCH time unit after UL BWP switching, and the K1 indicated in a DCI format that activates the SPS PDSCH configuration is in the set of K1 after UL BWP switching, the UE receives the SPS PDSCH(s) for the SPS PDSCH configuration; otherwise, the UE does not receive the SPS PDSCH(s) for the SPS PDSCH configuration.

This method is simple to implement, avoids the conversion of different PUCCH time units and/or K1, and avoids the reactivation of SPS PDSCH configuration, and thus reduces the PDCCH signaling overhead, improves the reliability of downlink data transmission, and reduces the downlink data delay.

Embodiment 4

In EMBODIMENT 4, whether to receive the SPS PDSCH(s) may be determined according to a HARQ-ACK codebook type. In some cases, for a SPS PDSCH configuration, the timing parameter K1 indicated in a DCI format that activates the SPS PDSCH configuration may not be in the set of timing parameters K1 after UL BWP switching. At this time, it may be specified by protocols and configured by higher layer signaling that if the HARQ-ACK codebook is a dynamic codebook and/or an enhanced dynamic codebook, the UE receives the SPS PDSCH(s). If the HARQ-ACK codebook is a semi-static codebook, the UE does not receive the SPS PDSCH(s).

It should be noted that if the HARQ-ACK codebook is a semi-static codebook, for a SPS PDSCH configuration, the K1 indicated in a DCI format that activates the SPS PDSCH configuration may not be in the set of K1 after UL BWP switching. At this time, the K1 indicated in the DCI format that activates the SPS PDSCH configuration may be put into (for example, included into) the set of K1 after UL BWP switching (the set of K1 associated with the active UL BWP after UL BWP switching) to obtain an extended set of K1, and then the semi-static HARQ-ACK codebook is generated according to the extended set of K1.

The method can avoid the situation that the HARQ-ACK for the SPS PDSCH has no corresponding bit in the semi-static codebook, and can improve the reliability of the HARQ-ACK transmission.

In some cases, the UE may be configured with MBS services. Transmission parameters (for example, an MBS frequency resource in a downlink BWP) of MBS PDSCH(s) may be configured for the downlink BWP through an MBS CFR configuration (e.g., 3GPP IE CFR-ConfigMulticast). The UE receives the MBS PDSCH(s)(i.e., the PDSCH(s) for MBS) within an MBS CFR. In the case of downlink BWP switching, a reactivation for SPS PDSCHs is required regardless of whether the BWP after DL BWP switching includes the MBS CFR before DL BWP switching, which may cause additional PDCCH signaling overhead.

In some embodiments, at least one of the above-mentioned EMBODIMENT 2 and the following embodiments EMBODIMENT 5 to EMBODIMENT 8 can be adopted to receive the SPS PDSCH(s) (e.g., the multicast SPS PDSCH). For example, in the case of DL BWP switching, at least one of the above-mentioned EMBODIMENT 2 and the following embodiments EMBODIMENT 5 to EMBODIMENT 8 may be adopted to receive the MBS SPS PDSCH(s) (i.e., the SPS PDSCH(s) for MBS).

Embodiment 5

In EMBODIMENT 5, whether to receive the SPS PDSCH(s) may be determined according to whether the MBS CFR changes before and after DL BWP switching. For example, whether to receive the SPS PDSCH(s) may be determined according to whether the MBS CFR before DL BWP switching (the MBS CFR associated with the active BWP before DL BWP switching) and the MBS CFR after DL BWP switching (the MBS CFR associated with the active BWP after DL BWP switching) are the same. In some embodiments, if the MBS CFR before DL BWP switching is the same as the MBS CFR after DL BWP switching, the UE receives the SPS PDSCH(s); and/or, if the MBS CFR before DL BWP switching is different from the MBS CFR after DL BWP switching, the UE does not receive the SPS PDSCH(s).

This method is simple to implement, and can avoid the reactivation of the SPS PDSCH configuration, and thus can reduce the PDCCH signaling overhead, improve the reliability of the downlink data transmission, and reduce the downlink data delay.

Embodiment 6

In EMBODIMENT 6, whether to receive the SPS PDSCH(s) may be determined according to whether frequency domain resource(s) of the SPS PDSCH(s) is(are) within the MBS CFR after DL BWP switching (for example, the MBS CFR associated with the active DL BWP after DL BWP switching). For example, for a SPS PDSCH configuration, if the SPS PDSCH for the SPS PDSCH configuration (e.g., its frequency domain resource) is within the MBS CFR after DL BWP switching, the UE receives the SPS PDSCH for the SPS PDSCH configuration; and/or, if the SPS PDSCH for the SPS PDSCH configuration (e.g., its frequency domain resource) is not within the MBS CFR after DL BWP switching, the UE does not receive the SPS PDSCH for the SPS PDSCH configuration.

This method is simple to implement, and can avoid the reactivation of the SPS PDSCH configuration, and thus can reduce the PDCCH signaling overhead, improve the reliability of the downlink data transmission, and reduce the downlink data delay.

Embodiment 7

In EMBODIMENT 7, whether to receive the SPS PDSCH(s) may be determined according to whether an associated SPS PDSCH configuration is contained in a SPS PDSCH configuration list for the MBS CFR after DL BWP switching (for example, the MBS CFR associated with the active DL BWP after DL BWP switching). For example, for a SPS PDSCH configuration, if the SPS PDSCH configuration (for example, a SPS PDSCH configuration index) is in the SPS PDSCH configuration list (for example, the 3GPP parameter sps-ConfigMulticastToAddModList) for the MBS CFR after DL BWP switching, the UE receives the SPS PDSCH(s) for the SPS PDSCH configuration; and/or, if the SPS PDSCH configuration is not in the SPS PDSCH configuration list for the MBS CFR after DL BWP switching, the UE does not receive the SPS PDSCH(s) for the SPS PDSCH configuration.

The method is simple to implement, and can avoid the reactivation of the SPS PDSCH configuration, and thus can reduce the PDCCH signaling overhead, improve the reliability of the downlink data transmission, and reduce the downlink data delay.

Embodiment 8

In EMBODIMENT 8, whether to receive the SPS PDSCH(s) may be determined according to whether the frequency domain resource(s) of the SPS PDSCH(s) is(are) within the BWP after DL BWP switching (for example, the active BWP after DL BWP switching). For example, for a SPS PDSCH configuration, if the SPS PDSCH(s) for the SPS PDSCH configuration (e.g., its frequency domain resource) is within the BWP after DL BWP switching, the UE receives the SPS PDSCH(s) for the SPS PDSCH configuration; and/or, if the SPS PDSCH(s) for the SPS PDSCH configuration (e.g., its frequency domain resource) is(are) not within the BWP after DL BWP switching, the UE does not receive the SPS PDSCH(s) for the SPS PDSCH configuration. It should be noted that, the SPS PDSCH(s) being in the BWP after DL BWP switching may be that the SCS before DL BWP switching is the same as the SCS after DL BWP switching and the frequency domain resource for the BWP after switching includes the frequency domain resource occupied by the SPS PDSCH(s).

The method is simple to implement, and can avoid the reactivation of the SPS PDSCH configuration, and thus can reduce the PDCCH signaling overhead, improve the reliability of the downlink data transmission, and reduce the downlink data delay.

In some cases, whether a DCI format (e.g., DCI format 4_2, which is used for scheduling MBS PDSCHs in DL cells) can dynamically indicate a HARQ-ACK feedback mode (for example, the above-mentioned mode 1 (transmitting HARQ-ACK) or the above-mentioned mode 2 (not transmitting HARQ-ACK)) may be configured by a higher layer parameter (e.g., 3GPP parameter harq-FeedbackEnablerMulticast) that indicates whether the HARQ-ACK feedback mode is indicated in DCI. In an example, if the higher layer parameter (harq-FeedbackEnabler-Multicast) is provided to the UE for a multicast RNTI (e.g., G-RNTI or G-CS-RNTI), and its value is set to a predetermined value (e.g., "DCI enabler" such as "dci-enabler"), the UE may determine the HARQ-ACK feedback mode (for example, whether to provide HARQ-ACK information for PDSCH receptions) based on an indication of a multicast DCI format associated with the multicast RNTI (e.g., G-RNTI or G-CS-RNTI). A higher layer parameter that indicates whether the HARQ-ACK feedback mode is indicated by the indication in DCI may be configured separately for each multicast RNTI (e.g., G-RNTI or G-CS-RNTI). When the UE is configured with multiple multicast RNTIs, how to determine the HARQ-ACK feedback mode is a problem to be solved.

In some embodiments, at least one of the following embodiments EMBODIMENT 9 to EMBODIMENT 11 may be adopted.

Embodiment 9

It may be specified by protocols that the UE does not expect the higher layer parameters that indicate whether the HARQ-ACK feedback mode is indicated in DCI configured for different multicast RNTIs to be different.

This method is simple to implement and can reduce the implementation complexity of the UE and base station.

Embodiment 10

It may be specified by protocols that for a DCI format (e.g., DCI format 4_2), if the higher layer parameter that indicates whether the HARQ-ACK feedback mode is indicated in DCI corresponding to at least one multicast RNTI (e.g., G-RNTI or G-CS-RNTI) among a plurality of multicast RNTIs is configured as "DCI enabler" (e.g., dci-enabler), then in the DCI format, the HARQ-ACK feedback Enabling/disabling indication field is 1 bit, otherwise, the HARQ-ACK feedback Enabling/disabling indication field is 0 bit.

In some cases, the UE receives a DCI format scrambled (e.g., cyclic redundancy check (CRC) for the DCI format scrambled) by a multicast RNTI (e.g., G-RNTI or G-CS-RNTI) and the HARQ-ACK feedback Enabling/disabling indication field in the DCI format is 1 bit, where the DCI format schedules a multicast PDSCH or indicates activation of a multicast SPS PDSCH configuration. If the higher layer parameter that indicates whether the HARQ-ACK feedback mode is indicated in DCI corresponding to the multicast RNTI is configured as "DCI enabler," the UE determines the HARQ-ACK feedback mode of the scheduled PDSCH or the activated SPS PDSCH according to the indication of the HARQ-ACK feedback Enabling/disabling indication field in the DCI format. For example, if the HARQ-ACK feedback Enabling/disabling indication field in the DCI format is 1, the UE transmits HARQ-ACK, otherwise, the UE does not transmit HARQ-ACK.

It should be noted that in embodiments of the disclosure, "DCI format scrambled by RNTI" may mean or be understood as "DCI format with CRC scrambled by RNTI."

The method can provide a flexible method for indicating HARQ-ACK feedback, in which uplink signaling overhead for services not requiring HARQ-ACK feedback is reduced, and for services requiring HARQ-ACK feedback, the PDSCH of the service can be retransmitted through the HARQ-ACK feedback, thereby improving reliability.

Embodiment 11

It may be specified by protocols that for a DCI format (e.g., DCI format 4_2), a number of bits of each field (each information field) in the DCI format is determined according to a multicast RNTI (e.g., G-RNTI or G-CS-RNTI) which is used to scramble the DCI format. If a total number of bits of each field (i.e., the sum of the number of bits of each field) X is smaller than the size (e.g., the number of bits) Y of the DCI format configured by higher layer parameters (e.g., 3GPP parameter sizeDCI-4-2), the last Y-X bits of the DCI format are considered as reserved bits (e.g., the values of the reserved bits may be 0; for another example, the values of the reserved bits may be 1).

For example, for a DCI format (e.g., DCI format 4_2), if the higher layer parameter that indicates whether the HARQ-ACK feedback mode is indicated in DCI corresponding to a first multicast RNTI (e.g., G-RNTI or G-CS-RNTI) which is used to scramble the DCI format (e.g., to scramble the CRC of the DCI format) indicates whether the HARQ-ACK feedback mode is indicated in the DCI is configured as "DCI enabler" (e.g., dci-enabler), then in the DCI format, the HARQ-ACK feedback Enabling/disabling indication field is 1 bit, otherwise, the HARQ-ACK feedback Enabling/disabling indication field is 0 bit.

For another example, for a DCI format (e.g., DCI format 4_2), if the higher layer parameter that indicates whether the HARQ-ACK feedback mode is indicated in DCI corresponding to a second multicast RNTI (e.g., G-RNTI or G-CS-RNTI) which is used to scramble the DCI format (e.g., to scramble the CRC of the DCI format) is not configured, then in the DCI format, the HARQ-ACK feedback Enabling/disabling indication field is 0 bit, and optionally, the K1 field in the DCI format may be 0 bit and/or the PRI field may be 0 bit.

This method is simple to implement, can reduce the complexity of the implementation of UE and base station, and can reduce the number of bits of DCI.

Figure 9:
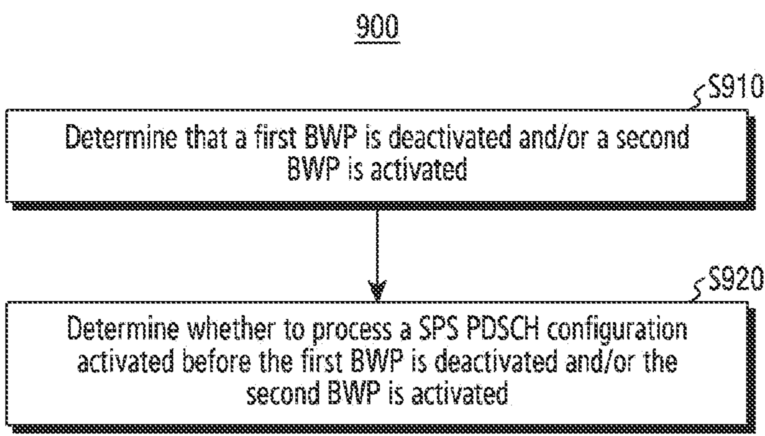
FIG. 9 illustrates a flowchart of a method performed by a terminal according to some embodiments of the present disclosure.

FIG. 9 illustrates a flowchart of a method 900 performed by a terminal according to some embodiments of the present disclosure.

Referring to FIG. 9, in operation S910, the terminal may determine that a first BWP is deactivated and/or a second BWP is activated.

In operation S920, the terminal may determine whether to process a semi-persistent scheduling (SPS) physical downlink shared channel (PDSCH) configuration activated before the first BWP is deactivated and/or the second BWP is activated.

In some embodiments, the determining of whether to process the SPS PDSCH configuration activated before the first BWP is deactivated and/or the second BWP is activated may include determining whether to suspend or clear the SPS PDSCH configuration activated before the first BWP is deactivated and/or the second BWP is activated.

In some embodiments, when the SPS PDSCH configuration is suspended or cleared, a SPS PDSCH for the SPS PDSCH configuration is not received and/or the SPS PDSCH configuration is released.

For example, when the first BWP and the second BWP are UL BWPs, the first BWP being deactivated and the second BWP being activated may correspond to uplink BWP switching.

For example, when the first BWP and the second BWP are DL BWPs, the first BWP being deactivated and the second BWP being activated may correspond to downlink BWP switching.

In some embodiments, for example, the first BWP and the second BWP are UL BWPs, where the first BWP is deactivated, and the determining of whether to process the SPS PDSCH configuration activated before the first BWP is deactivated and/or the second BWP is activated may include: determining not to process the SPS PDSCH configuration activated before the first BWP is deactivated and/or the second BWP is activated.

In some embodiments, for example, the first BWP and the second BWP are UL BWPs, where the second BWP is activated, and the determining of whether to process the SPS PDSCH configuration activated before the first BWP is deactivated and/or the second BWP is activated may include: determining not to process the SPS PDSCH configuration activated before the first BWP is deactivated and/or the second BWP is activated, and/or determining whether to suspend or clear the SPS PDSCH configuration activated before the first BWP is deactivated and/or the second BWP is activated.

In some embodiments, for example, the determining of whether to suspend or clear the SPS PDSCH configuration activated before the first BWP is deactivated and/or the second BWP is activated may include at least one of the following:

determining whether to suspend or clear the SPS PDSCH configuration activated before the first BWP is deactivated and/or the second BWP is activated based on an associated HARQ-ACK feedback mode;

determining whether to suspend or clear the SPS PDSCH configuration activated before the first BWP is deactivated and/or the second BWP is activated based on configuration information on whether to receive SPS PDSCH, where the configuration information is received from a base station via higher layer signalling;

determining whether to suspend or clear the SPS PDSCH configuration activated before the first BWP is deactivated and/or the second BWP is activated based on a PUCCH time unit associated with the first BWP and a PUCCH time unit associated with the second BWP;

determining whether to suspend or clear the SPS PDSCH configuration activated before the first BWP is deactivated and/or the second BWP is activated based on a set of time parameters K1 associated with the first BWP for HARQ-ACK information transmission and a set of timing parameters K1 associated with the second BWP; or determining whether to suspend or clear the SPS PDSCH configuration activated before the first BWP is deactivated and/or the second BWP is activated based on an associated HARQ-ACK codebook type.

In some embodiments, for example, the determining of whether to suspend or clear the SPS PDSCH configuration activated before the first BWP is deactivated and/or the second BWP is activated based on an associated HARQ-ACK feedback mode may include:

in case that the HARQ-ACK feedback mode indicates that HARQ-ACK feedback is required, suspending or clearing the SPS PDSCH configuration activated before the first BWP is deactivated and/or the second BWP is activated; and/or in case that the HARQ-ACK feedback mode indicates that the HARQ-ACK feedback is not required, receiving a SPS PDSCH for the SPS PDSCH configuration activated before the first BWP is deactivated and/or the second BWP is activated or restoring the SPS PDSCH configuration activated before the first BWP is deactivated and/or the second BWP is activated, and/or suspending or clearing the SPS PDSCH configuration activated before the first BWP is deactivated and/or the second BWP is activated.

In some embodiments, for example, the determining of whether to suspend or clear the SPS PDSCH configuration activated before the first BWP is deactivated and/or the second BWP is activated may include, in case that at least one of the following is satisfied, receiving a SPS PDSCH for the SPS PDSCH configuration activated before the first BWP is deactivated and/or the second BWP is activated or restoring the SPS PDSCH configuration activated before the first BWP is deactivated and/or the second BWP is activated, and/or in case that at least one of the following is not satisfied, suspending or clearing the SPS PDSCH configuration activated before the first BWP is deactivated and/or the second BWP is activated:

the PUCCH time unit associated with the first BWP being the same as the PUCCH time unit associated with the second BWP;

the set of timing parameters K1 associated with the first BWP being the same as the set of timing parameters K1 associated with the second BWP;

the set of timing parameters K1 associated with the first BWP being in the set of timing parameters K1 associated with the second BWP; or the timing parameter K1 indicated in a downlink control information (DCI) format that activates the SPS PDSCH configuration of the SPS PDSCH being in the set of timing parameters K1 associated with the second BWP.

In some embodiments, for example, the first BWP and the second BWP are DL BWPs, where the first BWP is deactivated, and the determining of whether to process the SPS PDSCH configuration activated before the first BWP is deactivated and/or the second BWP is activated may include: suspending the SPS PDSCH configuration activated before the first BWP is deactivated and/or the second BWP is activated; and/or determining whether to clear the SPS PDSCH configuration activated before the first BWP is deactivated and/or the second BWP is activated.

In some embodiments, for example, the first BWP and the second BWP are DL BWPs, where the second BWP is activated, and the determining of whether to process the SPS PDSCH configuration activated before the first BWP is deactivated and/or the second BWP is activated may include: determining whether to restore the SPS PDSCH configuration activated before the first BWP is deactivated and/or the second BWP is activated; and/or determining whether to clear the SPS PDSCH configuration activated before the first BWP is deactivated and/or the second BWP is activated.

In some embodiments, for example, the determining of whether to clear the SPS PDSCH configuration activated before the first BWP is deactivated and/or the second BWP is activated may include at least one of the following:

- determining whether to clear or initialize the SPS PDSCH configuration activated before the first BWP is deactivated and/or the second BWP is activated based on whether an MBS CFR associated with the first BWP is the same the MBS CFR associated with the second BWP;
- determining whether to clear or initialize the SPS PDSCH configuration activated before the first BWP is deactivated and/or the second BWP is activated based on configuration information on whether to receive the SPS PDSCH for multicast, where the configuration information is received from a base station via higher layer signalling;
- determining whether to clear or initialize the SPS PDSCH configuration activated before the first BWP is deactivated and/or the second BWP is activated based on whether frequency domain resources of the SPS PDSCH for the SPS PDSCH configuration are included in the MBS CFR associated with the second BWP;
- determining whether to clear or initialize the SPS PDSCH configuration activated before the first BWP is deactivated and/or the second BWP is activated based on whether the SPS PDSCH configuration activated before the first BWP is deactivated and/or the second BWP is activated is included in a SPS PDSCH configuration list for the MBS CFR associated with the second BWP; or
- determining whether to clear or initialize the SPS PDSCH configuration activated before the first BWP is deactivated and/or the second BWP is activated based on whether the frequency domain resources of the SPS PDSCH for the SPS PDSCH configuration are included in the second BWP.

In some embodiments, for example, the determining of whether to clear the SPS PDSCH configuration activated before the first BWP is deactivated and/or the second BWP is activated may include, in case that at least one of the following is satisfied, receiving a SPS PDSCH for the SPS PDSCH configuration activated before the first BWP is deactivated and/or the second BWP is activated or restoring the SPS PDSCH configuration activated before the first BWP is deactivated and/or the second BWP is activated, and/or in case that at least one of the following is not satisfied, clearing the SPS PDSCH configuration activated before the first BWP is deactivated and/or the second BWP is activated:

- the MBS CFR associated with the first BWP being the same as the MBS CFR associated with the second BWP;
- configuration information on whether to receive the SPS PDSCH for multicast, where the configuration information is received from a base station via higher layer signalling;
- the frequency domain resources of the SPS PDSCH for the SPS PDSCH configuration being included in the MBS CFR associated with the second BWP;
- the SPS PDSCH configuration activated before the first BWP is deactivated and/or the second BWP is activated being included in the SPS PDSCH configuration list for the MBS CFR associated with the second BWP;
- frequency domain resources of the SPS PDSCH for the SPS PDSCH configuration being included in the second BWP; or
- a subcarrier spacing (SCS) before the first BWP is deactivated and/or the second BWP is activated being the same as a SCS after the first BWP is deactivated and/or the second BWP is activated, and the frequency domain resources of the SPS PDSCH for the SPS PDSCH configuration are included in frequency domain resources of the second BWP.

In some embodiments, for example, operations S910 and/or S920 and/or other additional operations may be performed based on various embodiments of the disclosure described above.

Figure 10:
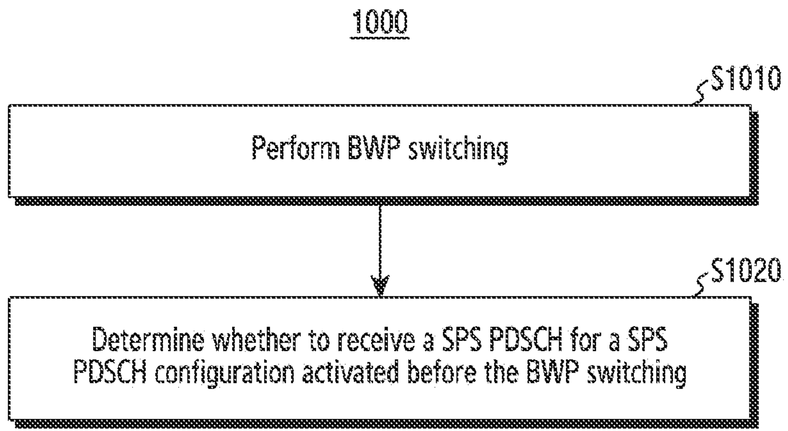
FIG. 10 illustrates a flowchart of a method performed by a terminal according to some embodiments of the present disclosure.

FIG. 10 illustrates a flowchart of a method 1000 performed by a terminal according to some embodiments of the present disclosure.

Referring to FIG. 10, in operation S1010, the terminal may perform BWP switching.

In some embodiments, the BWP switching is used to activate an inactive BWP and deactivate an active BWP. For example, when BWP switching from a current active BWP to another BWP is performed, the current active BWP is deactivated and the other BWP is activated.

In some embodiments, the BWP switching may include uplink BWP switching and/or downlink BWP switching. For example, the BWP switching may be performed based on a BWP switching indication (e.g., via a physical downlink control channel (PDCCH) and/or higher layer signaling, such as radio resource control (RRC) signaling) and/or an associated timer.

In operation S1020, the terminal may determine whether to receive a SPS PDSCH for a SPS PDSCH configuration activated before the BWP switching.

In some embodiments, for example, the BWP switching is UL BWP switching. The determining of whether to receive the SPS PDSCH for the SPS PDSCH configuration activated before the BWP switching may include at least one of the following:

- determining whether to receive the SPS PDSCH for the SPS PDSCH configuration activated before the BWP switching based on an associated HARQ-ACK feedback mode;
- determining whether to receive the SPS PDSCH for the SPS PDSCH configuration activated before the BWP switching based on configuration information on whether to receive the SPS PDSCH, where the configuration information is received from a base station via higher layer signalling;
- determining whether to receive the SPS PDSCH for the SPS PDSCH configuration activated before the BWP switching based on a PUCCH time unit associated with the active BWP before the BWP switching and a PUCCH time unit associated with the active BWP after the BWP switching;

determining whether to receive the SPS PDSCH for the SPS PDSCH configuration activated before the BWP switching based on a set of timing parameters K1 associated with the active BWP before the BWP switching and a set of timing parameters K1 associated with the active BWP after the BWP switching; or determining whether to receive the SPS PDSCH for the SPS PDSCH configuration activated before the BWP switching based on an associated HARQ-ACK codebook type.

In some embodiments, for example, the determining of whether to receive the SPS PDSCH for the SPS PDSCH configuration activated before the BWP switching based on the associated HARQ-ACK feedback mode may include:

in case that the HARQ-ACK feedback mode indicates that HARQ-ACK feedback is required, not receiving the SPS PDSCH for the SPS PDSCH configuration activated before the BWP switching; and/or in case that the HARQ-ACK feedback mode indicates that the HARQ-ACK feedback is not required, receiving the SPS PDSCH for the SPS PDSCH configuration activated before the BWP switching or restoring the SPS PDSCH configuration activated before the BWP switching.

In some examples, for example, the determining of whether to receive the SPS PDSCH configuration activated before the BWP switching may include, in case that at least one of the following is satisfied, receiving the SPS PDSCH for the SPS PDSCH configuration activated before the BWP switching or restoring the SPS PDSCH configuration activated before the BWP switching, and/or in case that at least one of the following is not satisfied, not receiving the SPS PDSCH for the SPS PDSCH configuration activated before the BWP switching or releasing the SPS PDSCH configuration activated before the BWP switching:

the PUCCH time unit associated with the active BWP before the BWP switching being the same as the PUCCH time unit associated with the active BWP after the BWP switching;

the set of timing parameters K1 associated with the active BWP before the BWP switching being the same as the set of timing parameters K1 associated with the active BWP after the BWP switching;

the set of timing parameters K1 associated with the active BWP before the BWP switching being in the set of timing parameters K1 associated with the active BWP after the BWP switching; or the timing parameter K1 indicated in a DCI format that activates the SPS PDSCH configuration of the SPS PDSCH being in the set of timing parameters K1 associated with the active BWP after the BWP switching.

In some embodiments, for example, the BWP switching is downlink UL BWP switching. The determining of whether to receive the SPS PDSCH for the SPS PDSCH configuration activated before the BWP switching may include at least one of the following:

determining whether to receive the SPS PDSCH for the SPS PDSCH configuration activated before the BWP switching based on whether an MBS CFR associated with the active BWP before the BWP switching is the same as the MBS CFR associated with the active BWP after the BWP switching;

determining whether to receive the SPS PDSCH for the SPS PDSCH configuration activated before the BWP switching based on configuration information on whether to receive SPS PDSCH for multicast, where the configuration information is received from a base station via higher layer signalling;

determining whether to receive the SPS PDSCH for the SPS PDSCH configuration activated before the BWP switching based on whether frequency domain resources of the SPS PDSCH for the SPS PDSCH configuration are included in the MBS CFR associated with the active BWP after the BWP switching;

determining whether to receive the SPS PDSCH for the SPS PDSCH configuration activated before the BWP switching based on whether the SPS PDSCH configuration activated before the BWP switching is included in a SPS PDSCH configuration list for the MBS CFR associated with the active BWP after the BWP switching, or determining whether to receive the SPS PDSCH for the SPS PDSCH configuration activated before the BWP switching based on whether the frequency domain resources of the SPS PDSCH for the SPS PDSCH configuration are included in the active BWP after the BWP switching.

In some embodiments, for example, the determining of whether to receive the SPS PDSCH for the SPS PDSCH configuration activated before the BWP switching may include, in case that at least one of the following is satisfied, receiving the SPS PDSCH for the SPS PDSCH configuration activated before the BWP switching or restoring the SPS PDSCH configuration activated before the BWP switching, and/or in case that at least one of the following is not satisfied, not receiving the SPS PDSCH for the SPS PDSCH configuration activated before the BWP switching or releasing the SPS PDSCH configuration activated before the BWP switching:

the MBS CFR associated with the active BWP before the BWP switching being the same as the MBS CFR associated with the active BWP after the BWP switching;

configuration information on whether to receive SPS PDSCH for multicast, where the configuration information is received from a base station via higher layer signalling;

the frequency domain resources of the SPS PDSCH for the SPS PDSCH configuration being included in the MBS CFR associated with the active BWP after the BWP switching;

the SPS PDSCH configuration activated before the BWP switching being included in the SPS PDSCH configuration list for the MBS CFR associated with the active BWP after the BWP switching;

the frequency domain resources of the SPS PDSCH for the SPS PDSCH configuration being included in the active BWP after the BWP switching; or a subcarrier spacing (SCS) before the BWP switching being the same as the SCS after the BWP switching and the frequency domain resources of the SPS PDSCH for the SPS PDSCH configuration being included in frequency domain resources of the active BWP after the BWP switching.

In some embodiments, for example, operations S1010 and/or S1020 and/or other additional operations may be performed based on various embodiments of the disclosure described above.

Figure 11:
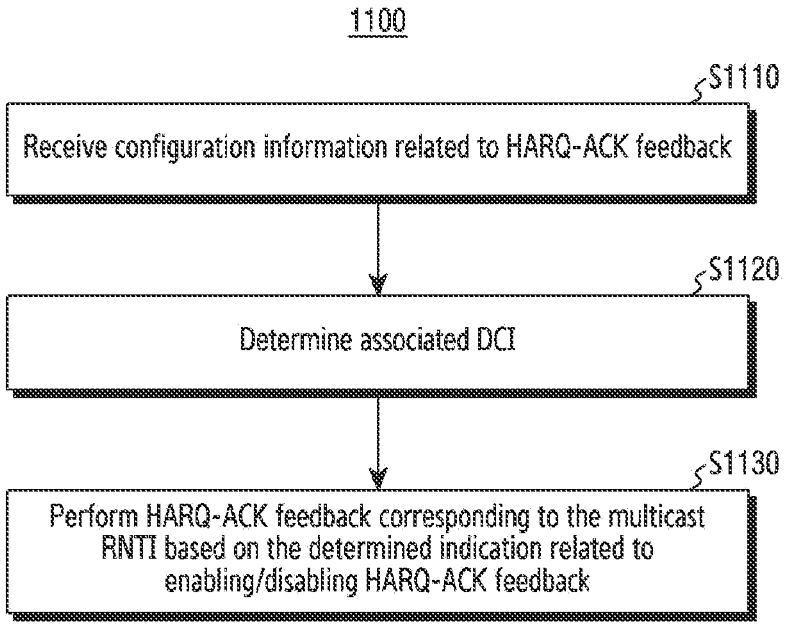
FIG. 11 illustrates a flowchart of a method performed by a terminal according to some embodiments of the present disclosure.

FIG. 11 illustrates a flowchart of a method 1100 performed by a terminal according to some embodiments of the present disclosure.

Referring to FIG. 11, in operation S1110, the terminal may receive configuration information related to HARQ-ACK feedback through a radio resource control (RRC) message, where the configuration information includes HARQ-ACK feedback related information for each multicast RNTI of one or more multicast RNTIs (for example, the above-mentioned harq-FeedbackEnabler-Multicast).

In operation S1120, the terminal may determine an indication related to enabling/disabling HARQ-ACK feedback (for example, the above-mentioned HARQ-ACK feedback Enabling/disabling indication) in associated downlink control information (DCI) (e.g., DCI format 4_2).

In operation S1130, the terminal may perform HARQ-ACK feedback corresponding to the multicast RNTI based on the determined indication related to enabling/disabling the HARQ-ACK feedback.

In some embodiments, for example, the determining of the indication related to enabling/disabling the HARQ-ACK feedback in the associated DCI based on the configuration information may include: determining the indication related to enabling/disabling the HARQ-ACK feedback in the DCI based on the HARQ-ACK feedback related information for at least one of the one or more multicast RNTIs.

In some embodiments, for example, the determining of the indication related to enabling/disabling the HARQ-ACK feedback in the associated DCI based on the configuration information may include: determining the indication related to enabling/disabling the HARQ-ACK feedback in the DCI based on the HARQ-ACK feedback related information for a multicast RNTI of the one or more multicast RNTIs that is associated with the DCI.

In some embodiments, for example, operations S1110 and/or S1120 and/or S1130 and/or other additional operations may be performed based on various embodiments of the disclosure described above (e.g., one or more of embodiments EMBODIMENT 9 to EMBODIMENT 11).

Figure 12:
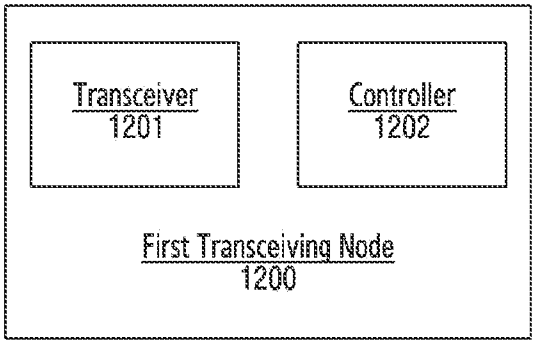
FIG. 12 illustrates a first transceiving node according to some embodiments of the present disclosure.

FIG. 12 illustrates a first transceiving node 1200 according to some embodiments of the present disclosure.

Referring to FIG. 12, the first transceiving node 1200 may include a transceiver 1201 and a controller 1202.

The transceiver 1201 may be configured to transmit first data and/or first control signaling to a second transceiving node and receive second data and/or second control signaling from the second transceiving node in a time unit.

The controller 1202 may be an application specific integrated circuit or at least one processor. The controller 1202 may be configured to control the overall operation of the first transceiving node, including controlling the transceiver 1201 to transmit first data and/or first control signaling to a second transceiving node and receive second data and/or second control signaling from the second transceiving node in a time unit.

In some embodiments, the controller 1202 may be configured to perform one or more operations in the methods according to various embodiments described above.

In the following description, the first transceiving node is illustrated by taking a base station as an example (but not limited to), and the second transceiving node is illustrated by taking a UE as an example (but not limited to). The first data and/or first control signaling is illustrated by taking downlink data and/or downlink control signaling as an example (but not limited to). The HARQ-ACK codebook may be included in second control signaling, which is illustrated by taking uplink control signaling as an example (but not limited to).

Figure 13:
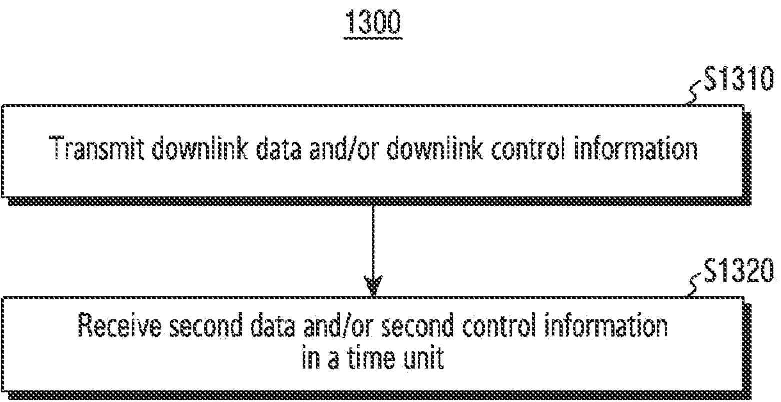
FIG. 13 illustrates a flowchart of a method performed by a base station according to some embodiments of the present disclosure.

FIG. 13 illustrates a flowchart of a method 1300 performed by a base station according to some embodiments of the present disclosure.

Referring to FIG. 13, in step S1310, a base station transmits downlink data and/or downlink control information.

In step S1320, the base station receives second data and/or second control information from a UE in a time unit.

For example, the method 1300 may include one or more of the operations performed by the base station described in various embodiments of the disclosure.

Figure 14:
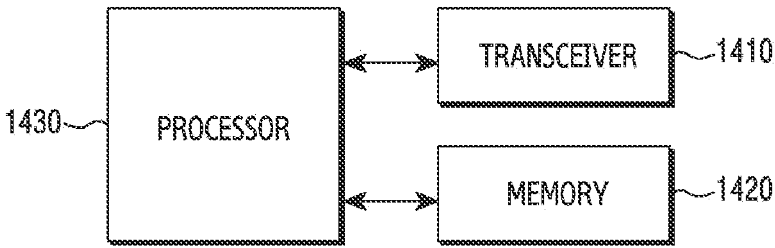
FIG. 14 illustrates a terminal according to embodiments of the present disclosure.

FIG. 14 illustrates a terminal (or a user equipment (UE)), according to embodiments of the present disclosure.

As shown in FIG. 14, a terminal according to an embodiment may include a transceiver 1410, a memory 1420, and a processor (or a controller) 1430. The transceiver 1410, the memory 1420, and the processor (or controller) 1430 of the terminal may operate according to a communication method of the terminal described above. However, the components of the terminal are not limited thereto. For example, the terminal may include more or fewer components than those described in FIG. 14. In addition, the processor (or controller) 1430, the transceiver 1410, and the memory 1420 may be implemented as a single chip. Also, the processor (or controller) 1430 may include at least one processor.

The transceiver 1410 collectively refers to a terminal station receiver and a terminal transmitter, and may transmit/receive a signal to/from a base station or another terminal. The signal transmitted or received to or from the terminal may include control information and data. The transceiver 1410 may include a RF transmitter for up-converting and amplifying a frequency of a transmitted signal, and a RF receiver for amplifying low-noise and down-converting a frequency of a received signal. However, this is only an example of the transceiver 1410 and components of the transceiver 1410 are not limited to the RF transmitter and the RF receiver.

Also, the transceiver 1410 may receive and output, to the processor (or controller) 1430, a signal through a wireless channel, and transmit a signal output from the processor (or controller) 1430 through the wireless channel.

The memory 1420 may store a program and data required for operations of the terminal. Also, the memory 1420 may store control information or data included in a signal obtained by the terminal. The memory 1420 may be a storage medium, such as read-only memory (ROM), random access memory (RAM), a hard disk, a CD-ROM, and a DVD, or a combination of storage media.

The processor (or controller) 1430 may control a series of processes such that the terminal operates as described above. For example, the processor (or controller) 1430 may receive a data signal and/or a control signal, and the processor (or controller) 1430 may determine a result of receiving the signal transmitted by the base station and/or the other terminal.

Figure 15:
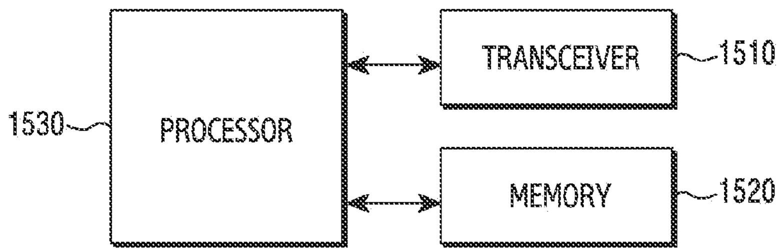
FIG. 15 illustrates a base station according to embodiments of the present disclosure.

FIG. 15 illustrates a base station according to embodiments of the present disclosure.

As shown in FIG. 15 is, the base station of the present disclosure may include a transceiver 1510, a memory 1520, and a processor (or, a controller) 1530. The transceiver 1510, the memory 1520, and the processor (or controller) 1530 of the base station may operate according to a communication method of the base station described above. However, the components of the base station are not limited thereto. For example, the base station may include more or fewer components than those described in FIG. 15. In addition, the processor (or controller) 1330, the transceiver 1510, and the memory 1520 may be implemented as a single chip. Also, the processor (or controller)1330 may include at least one processor.

The transceiver 1510 collectively refers to a base station receiver and a base station transmitter, and may transmit/receive a signal to/from a terminal, another base station, and/or a core network function(s) (or entity(s)). The signal transmitted or received to or from the base station may include control information and data. The transceiver 1510 may include a RF transmitter for up-converting and amplifying a frequency of a transmitted signal, and a RF receiver for amplifying low-noise and down-converting a frequency of a received signal. However, this is only an example of the transceiver 1510 and components of the transceiver 1510 are not limited to the RF transmitter and the RF receiver.

Also, the transceiver 1510 may receive and output, to the processor (or controller) 1530, a signal through a wireless channel, and transmit a signal output from the processor (or controller) 1530 through the wireless channel.

The memory 1520 may store a program and data required for operations of the base station. Also, the memory 1520 may store control information or data included in a signal obtained by the base station. The memory 1520 may be a storage medium, such as ROM, RAM, a hard disk, a CD-ROM, and a DVD, or a combination of storage media.

The processor (or controller) 1530 may control a series of processes such that the base station operates as described above. For example, the processor (or controller) 1530 may receive a data signal and/or a control signal, and the processor (or controller) 1530 may determine a result of receiving the signal transmitted by the terminal and/or the core network function.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the present disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

The above description is only an exemplary implementation of the present disclosure, and is not intended to limit the scope of protection of the present disclosure, which is determined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
- receiving, from a base station, information for configuring hybrid automatic repeat request-acknowledgement (HARQ-ACK) feedback mode for a first semi-persistent scheduling (SPS) physical downlink shared channel (PDSCH) configuration;
- identifying that a first bandwidth part (BWP) is deactivated and a second BWP is activated, wherein the first SPS PDSCH configuration is activated before the first BWP is deactivated and the second BWP is activated;
- when the first BWP is deactivated or the second BWP is activated, determining whether or not to process the first SPS PDSCH configuration based on the HARQ-ACK feedback mode;
- wherein the determining whether or not to process the first SPS PDSCH configuration based on the HARQ-ACK feedback mode includes:
  - suspending or clearing the first SPS PDSCH configuration when the HARQ-ACK feedback mode is a first mode in which HARQ-ACK feedback is required; and
  - performing reception of SPS PDSCHs based on the first SPS PDSCH configuration when the HARQ-ACK feedback mode is a second mode in which the HARQ-ACK feedback is not required,
- wherein the first BWP and the second BWP are uplink (UL) BWPs,
- wherein the UE is capable of transmitting ACK or negative acknowledgement (NACK) in the first mode, and
- wherein the UE is incapable of transmitting ACK or NACK in the second mode.

2. The method of claim 1, further comprising:
- identifying that a third BWP is deactivated and a fourth BWP is activated, wherein a second SPS PDSCH configuration is activated before the third BWP is deactivated and the fourth BWP is activated;
- when the third BWP is deactivated:
  - performing to suspend or clear the second SPS PDSCH configuration; and
- when the fourth BWP is activated:
  - performing to restore or clear the second SPS PDSCH configuration, wherein the third BWP and the fourth BWP are downlink (DL) BWPs.

3. The method of claim 2, wherein performing to clear the second SPS PDSCH configuration includes:
- performing to clear or initialize the second SPS PDSCH configuration based on at least one of:
- whether a multicast broadcast service (MBS) common frequency resource (CFR) associated with the third BWP is same as an MBS CFR associated with the fourth BWP;
- configuration information related to whether to receive a SPS PDSCH for a multicast, wherein the configuration information is received from a base station via a higher layer signaling;
- whether frequency domain resources of a SPS PDSCH for the second SPS PDSCH configuration are included in the MBS CFR associated with the fourth BWP;
- whether the second SPS PDSCH configuration is included in a SPS PDSCH configuration list for the MBS CFR associated with the fourth BWP; or
- whether frequency domain resources of a SPS PDSCH for the second SPS PDSCH configuration are included in the fourth BWP.

4. A user equipment (UE) comprising:
- at least one transceiver;
- at least one processor communicatively coupled to the at least one transceiver; and
- at least one memory, communicatively coupled to the at least one processor, storing instructions executable by the at least one processor individually or in any combination to cause the UE to:
  - receive, from a base station, information for configuring hybrid automatic repeat request-acknowledgement (HARQ-ACK) feedback mode for a first semi-persistent scheduling (SPS) physical downlink shared channel (PDSCH) configuration,
  - identify that a first bandwidth part (BWP) is deactivated and a second BWP is activated, wherein the first SPS PDSCH configuration is activated before the first BWP is deactivated and the second BWP is activated,
  - when the first BWP is deactivated or the second BWP is activated, determine whether or not to process the first SPS PDSCH configuration based on the HARQ-ACK feedback mode;
  - suspend or clear the first SPS PDSCH configuration when the HARQ-ACK feedback mode is a first mode in which HARQ-ACK feedback is required; and
  - performing reception of SPS PDSCHs based on the first SPS PDSCH configuration when the HARQ-ACK feedback mode is a second mode in which the HARQ-ACK feedback is not required,
- wherein the first BWP and the second BWP are uplink (UL) BWPs,
- wherein the UE is capable of transmitting ACK or negative acknowledgement (NACK) in the first mode, and
- wherein the UE is incapable of transmitting ACK or NACK in the second mode.

5. The UE of claim 4,
- wherein the instructions further cause the UE to:
- identify that a third BWP is deactivated and a fourth BWP is activated, wherein a second semi-persistent scheduling (SPS) physical downlink shared channel (PDSCH) configuration is activated before the third BWP is deactivated and the fourth BWP is activated, and when the third BWP is deactivated:

perform to suspend or clear the second SPS PDSCH configuration, when the fourth BWP is activated:

perform to restore or clear the second SPS PDSCH configuration, and wherein the third BWP and the fourth BWP are downlink (DL) BWPs.

6. The UE of claim 5, wherein the instructions further cause the UE to:

perform to clear or initialize the second SPS PDSCH configuration, based on at least one of:

whether a multicast broadcast service (MBS) common frequency resource (CFR) associated with the third BWP is same as an MBS CFR associated with the fourth BWP;

configuration information related to whether to receive a SPS PDSCH for a multicast, wherein the configuration information is received from a base station via higher layer signaling;

whether frequency domain resources of a SPS PDSCH for the second SPS PDSCH configuration are included in the MBS CFR associated with the fourth BWP;

whether the second SPS PDSCH configuration is included in a SPS PDSCH configuration list for the MBS CFR associated with the fourth BWP; or whether frequency domain resources of a SPS PDSCH for the second SPS PDSCH configuration are included in the fourth BWP.

7. A method performed by a base station in a wireless communication system, the method comprising:

transmitting, to a user equipment (UE), information for configuring hybrid automatic repeat request-acknowledgement (HARQ-ACK) feedback mode for a first semi-persistent scheduling (SPS) physical downlink shared channel (PDSCH) configuration;

transmitting, to the UE via a high layer signaling, configuring information for deactivating a first bandwidth part (BWP) or activating a second BWP, wherein the first SPS PDSCH configuration is activated before the first BWP is deactivated and the second BWP is activated; and transmitting, to the UE, SPS PDSCHs based on the first SPS PDSCH configuration, in when the HARQ-ACK feedback mode is a second mode in which HARQ-ACK feedback is not required, wherein the first SPS PDSCH configuration is suspended or cleared, when the HARQ-ACK feedback mode is a first mode in which the HARQ-ACK feedback is required, wherein the first BWP and the second BWP are uplink (UL) BWPs, wherein the UE is capable of transmitting ACK or negative acknowledgement (NACK) in the first mode, and wherein the UE is incapable of transmitting ACK or NACK in the second mode.

8. The method of claim 7, further comprising:

transmitting, to the UE via the high layer signaling, configuring information for deactivating a third BWP or activating a fourth BWP, wherein a second SPS PDSCH configuration is activated before the third BWP is deactivated and the fourth BWP is activated, wherein, when the third BWP is deactivated, the second SPS PDSCH configuration is suspended or cleared, wherein, when the fourth BWP is activated, the second SPS PDSCH configuration is restored or cleared, and wherein the third BWP and the fourth BWP are downlink (DL) BWPs.

9. The method of claim 8, wherein the second SPS PDSCH configuration is cleared or initialized based on at least one of:

whether a multicast broadcast service (MBS) common frequency resource (CFR) associated with the third BWP is same as an MBS CFR associated with the fourth BWP;

configuration information related to whether to receive a SPS PDSCH for a multicast, wherein the configuration information is received from a base station via a higher layer signaling;

whether frequency domain resources of a SPS PDSCH for the second SPS PDSCH configuration are included in the MBS CFR associated with the fourth BWP;

whether the second SPS PDSCH configuration is included in a SPS PDSCH configuration list for the MBS CFR associated with the fourth BWP; or whether frequency domain resources of a SPS PDSCH for the second SPS PDSCH configuration are included in the fourth BWP.

10. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE), information for configuring hybrid automatic repeat request-acknowledgement (HARQ-ACK) feedback mode for a first semi-persistent scheduling (SPS) physical downlink shared channel (PDSCH) configuration transmit, to the UE via a high layer signaling, configuring information for deactivating a first bandwidth part (BWP) or activating a second BWP, wherein the first SPS PDSCH configuration is activated before the first BWP is deactivated and the second BWP is activated, and transmit, to the UE, SPS PDSCHs based on the first SPS PDSCH configuration, when the HARQ-ACK feedback mode is a second mode in which HARQ-ACK feedback is not required, wherein the first SPS PDSCH configuration is suspended or cleared, when the HARQ-ACK feedback mode is a first mode in which the HARQ-ACK feedback is required, wherein the first BWP and the second BWP are uplink (UL) BWPs, wherein the UE is capable of transmitting ACK or negative acknowledgement (NACK) in the first mode, and wherein the UE is incapable of transmitting ACK or NACK in the second mode.

11. The base station of claim 10, wherein the instructions further cause the base station to:

transmit, to the UE, via the high layer signaling, configuring information for deactivating a third BWP or activating a fourth BWP, wherein a second SPS PDSCH configuration is activated before the third BWP is deactivated and the fourth BWP is activated, wherein, when the third BWP is deactivated, the second SPS PDSCH configuration is suspended or cleared, wherein, when the fourth BWP is activated, the second SPS PDSCH configuration is restored or cleared, and wherein the third BWP and the fourth BWP are downlink, DL, BWPs.

12. The base station of claim 11, wherein the second SPS PDSCH configuration cleared or initialized based on at least one of:

whether a multicast broadcast service (MBS) common frequency resource (CFR) associated with the third BWP is same as an MBS CFR associated with the fourth BWP;

configuration information related to whether to receive a SPS PDSCH for a multicast, wherein the configuration information is received from a base station via a higher layer signaling;

whether frequency domain resources of a SPS PDSCH for the second SPS PDSCH configuration are included in the MBS CFR associated with the fourth BWP;

whether the second SPS PDSCH configuration is included in a SPS PDSCH configuration list for the MBS CFR associated with the fourth BWP; or whether frequency domain resources of a SPS PDSCH for the second SPS PDSCH configuration are included in the fourth BWP.

* * * * *